US012737917B2

(12) United States Patent
Saxena et al.

(10) Patent No.: US 12,737,917 B2
(45) Date of Patent: Sep. 15, 2026

(54) COMBINING DOMAIN KNOWLEDGE AND FOUNDATION MODELS FOR ONE-SHOT MEDICAL IMAGE FEATURE LOCALIZATION

(71) Applicant: GE Precision Healthcare LLC, Waukesha, WI (US)

(72) Inventors: Ashish Saxena, Bengaluru (IN); Dattesh Dayanand Shanbhag, Bengaluru (IN); Deepa Anand, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 269 days.

(21) Appl. No.: 18/581,558

(22) Filed: Feb. 20, 2024

(65) Prior Publication Data

US 2025/0265729 A1 Aug. 21, 2025

(51) Int. Cl.

*G06V 20/70* (2022.01)
*G06T 7/73* (2017.01)
*G06V 10/40* (2022.01)
*G06V 10/82* (2022.01)

(52) U.S. Cl.

CPC ................ *G06T 7/74* (2017.01); *G06V 10/40* (2022.01); *G06V 10/82* (2022.01); *G06V 20/70* (2022.01); *G06T 2207/20081* (2013.01); *G06T 2207/20084* (2013.01); *G06T 2207/30012* (2013.01); *G06V 2201/033* (2022.01)

(58) Field of Classification Search

CPC ........ G06V 10/82; G06V 10/40; G06V 20/70; G06V 2201/033; G06T 7/74; G06T 2207/10081; G06T 2207/20081; G06T 2207/30012; G06T 2207/20084

See application file for complete search history.

(56) References Cited

PUBLICATIONS

Yan, Ke, et al. "SAM: Self-supervised Learning of Pixel-wise Anatomical Embeddings in Radiological Images." arXiv preprint arXiv:2012.02383v2 (2022). (Year: 2022).*

(Continued)

*Primary Examiner* — Tracy Mangialaschi
(74) *Attorney, Agent, or Firm* — Amin, Turocy & Watson, LLP

(57) ABSTRACT

One-shot medical image feature localization techniques are provided that employ pretrained foundation models and domain knowledge. In an example, a computer-implemented method can comprise determining positions of target features within a target medical image of an anatomical region of a subject based on reference spatial relationships between the target features as defined in reference spatial information, and based on matching reference pixel features respectively associated with the target features with corresponding subsets of pixel features of the target medical image, wherein the reference pixel features comprise template image pixel features extracted from labeled versions of the target features as included in a template medical image depicting the anatomical region of a reference subject. The method further comprises generating label information for the target features identifying the target features and their positions and associating the label information with the target medical image.

20 Claims, 12 Drawing Sheets

(56) References Cited

PUBLICATIONS

Ullmann, Eugénie, et al. "Automatic labeling of vertebral levels using a robust template-based approach." International journal of biomedical imaging 2014.1 (2014): 719520. (Year: 2014).*

Anand, et al., "System and Method for One-Shot Anatomy Localization With Unsupervised Vision Transformers for Three-Dimensional (3D) Medical Images," U.S. Appl. No. 18/475,406, filed Sep. 27, 2023.

Forsberg, et al., "Detection and Labeling of Vertebrae in MR Images Using Deep Learning with Clinical Annotations as Training Data," J Digit Imaging, Aug. 30, 2017, (4): 406-412, doi: 10.1007/s10278-017-9945-x.

Cina, et al., "2-step deep learning model for landmarks localization in spine radiographs." Scientific Reports vol. 11, Article No. 9482 Published: May 4, 2021, Published: May 4, 2021.

* cited by examiner

Target Image 204

Template Image 202

Template Image 402

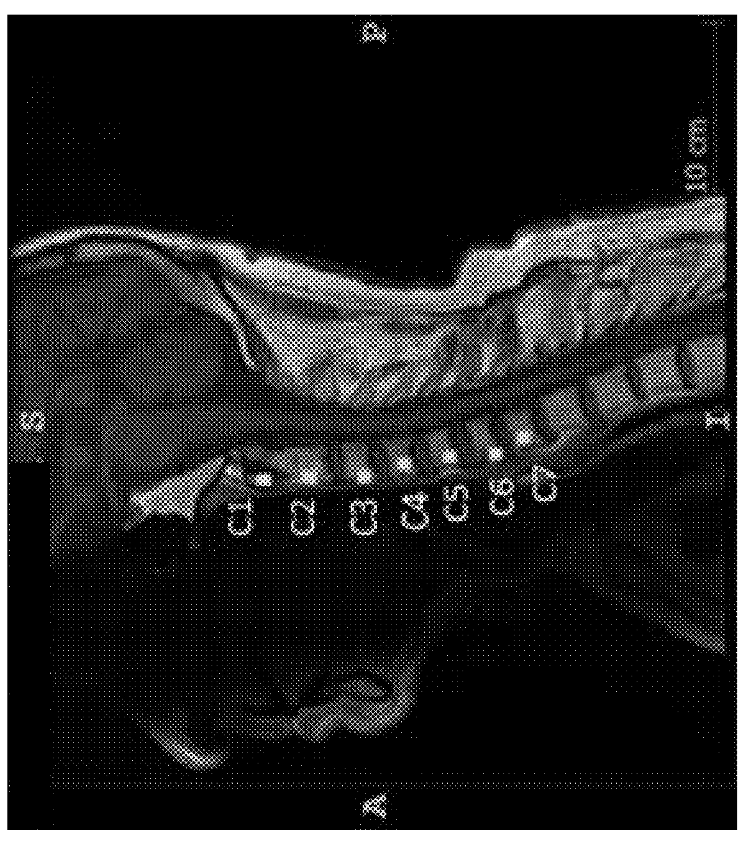
Example Cervical Spine Station Vertebrae Labels
FIG. 5
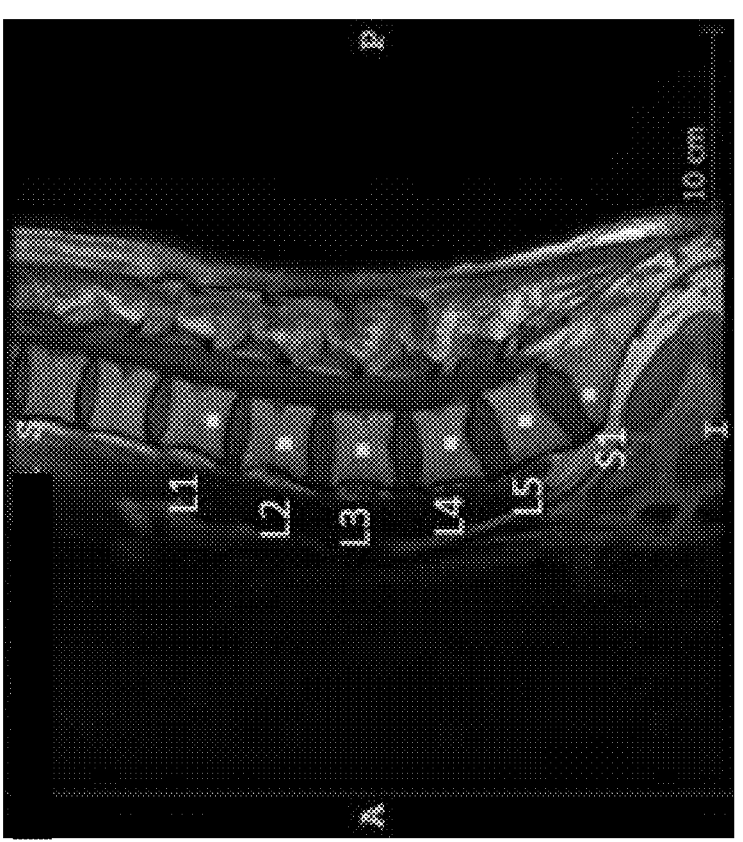
Example Lumber Spine Station Vertebrae Labels

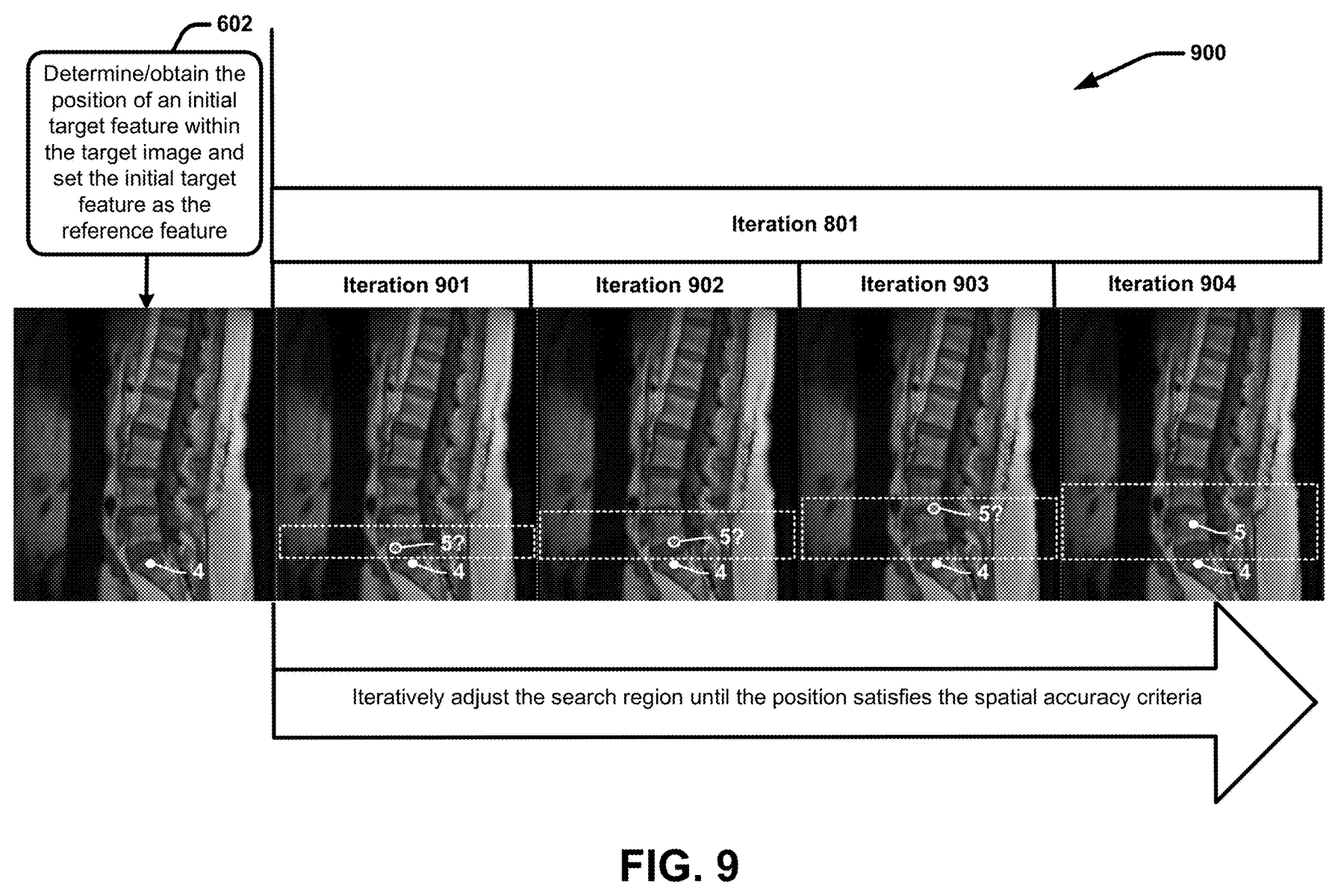

900

602

Determine/obtain the position of an initial target feature within the target image and set the initial target feature as the reference feature

4

Iteration 801

Iteration 901

5?

4

Iteration 902

5?

4

Iteration 903

5?

4

Iteration 904

5

4

Iteratively adjust the search region until the position satisfies the spatial accuracy criteria

FIG. 9

COMBINING DOMAIN KNOWLEDGE AND FOUNDATION MODELS FOR ONE-SHOT MEDICAL IMAGE FEATURE LOCALIZATION

TECHNICAL FIELD

This application relates to artificial intelligence (AI) in the medical imaging domain, and more particularly to one-shot medical image feature localization using pretrained foundation models and domain knowledge.

BACKGROUND

Deep learning (DL) models have demonstrated state-of-the-art performance in various medical image processing tasks like organ segmentation, anomaly detection, diagnosis classification, risk prediction, temporal analysis, image reconstruction, and others. For example, AI can be used in medical imaging to automatically characterize features in images to make radiologists more efficient, minimize errors, and help them make their reports more quantitative and useful for the patients they serve. However, the development of AI models capable of generating inferences with the level of accuracy and consistency required for clinical applications is limited by the fact that these types of models typically must be trained and validated using mass amounts of accurately annotated training data, which is often not available or expensive and difficult to obtain.

Currently techniques for generating annotated training data for machine learning in healthcare informatics are inefficient, burdensome and prone to error. For example, manual annotation is the primary method via which annotated medical images are obtained for training medical image inferencing models. Manual annotation requires human experts to manually review medical image datasets and apply labels to the medical images identifying the features of interest (e.g., anatomical landmarks, lesions, artifacts, and various others) and defining relevant characteristics of the features (e.g., location, size, appearance, pathology, etc.). Manual annotation is thus extremely tedious, expensive and time-consuming. Accordingly, techniques for automating annotation of medical images are desired.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described that combine domain knowledge and foundation models for one-shot medical image feature localization and labeling.

According to an embodiment, a system is provided that comprises a memory that stores computer-executable components, and a processor that executes the computer-executable components stored in the memory. The computer-executable components can comprise a feature localization component that determines positions of target features within a target medical image of an anatomical region of a subject based on reference spatial relationships between the target features as defined in reference spatial information, and based on matching reference pixel features respectively associated with the target anatomical features with corresponding subsets of pixel features of the target medical image, wherein the reference pixel features comprise template image pixel features extracted from labeled versions of the target features as included in a template medical image depicting a corresponding anatomical region of a reference subject. The computer-executable components further comprise a labeling component that generates label information for the target features identifying the target features and their positions and associates the label information with the target medical image.

In one or more implementations, the pixel features of the target image and the reference pixel features respectively comprise extracted pixel features respectively extracted from the target medical and the template image using one or more feature extraction models trained on natural images.

In some implementation, the feature localization component further determines the positions of the target features within additional target medical images corresponding to the target medical image based on the reference spatial relationships and based on performing the matching for the additional target medicals using the reference pixel features (e.g., corresponding to a one-shot feature localization process as the same template, image reference pixel features are used for a plurality of different target medicals).

In various embodiments, the feature localization component determines the positions of respective ones of the target features individually and determines a position of a current target feature based on a previously determined position of a previously localized target feature within the target medical image. In some implementations of these embodiments, the feature localization component restricts respective regions of the pixel features of the target medical searched in association with performing the matching based on respective positions of previously localized target features within the target medical and/or the reference spatial relationships.

In some embodiments, elements described in connection with the disclosed systems can be embodied in different forms such as a computer-implemented method, a computer program product, or another form.

DESCRIPTION OF THE DRAWINGS

FIG. 5 presents example medical labels for the lumber spine station vertebrae and the cervical spine station vertebrae, in accordance with one or more embodiments of the disclosed subject matter.

FIG. 9 demonstrates an example iterative sub-process for optimizing feature localization, in accordance with one or more embodiments of the disclosed subject matter.

DETAILED DESCRIPTION

Figure 1:
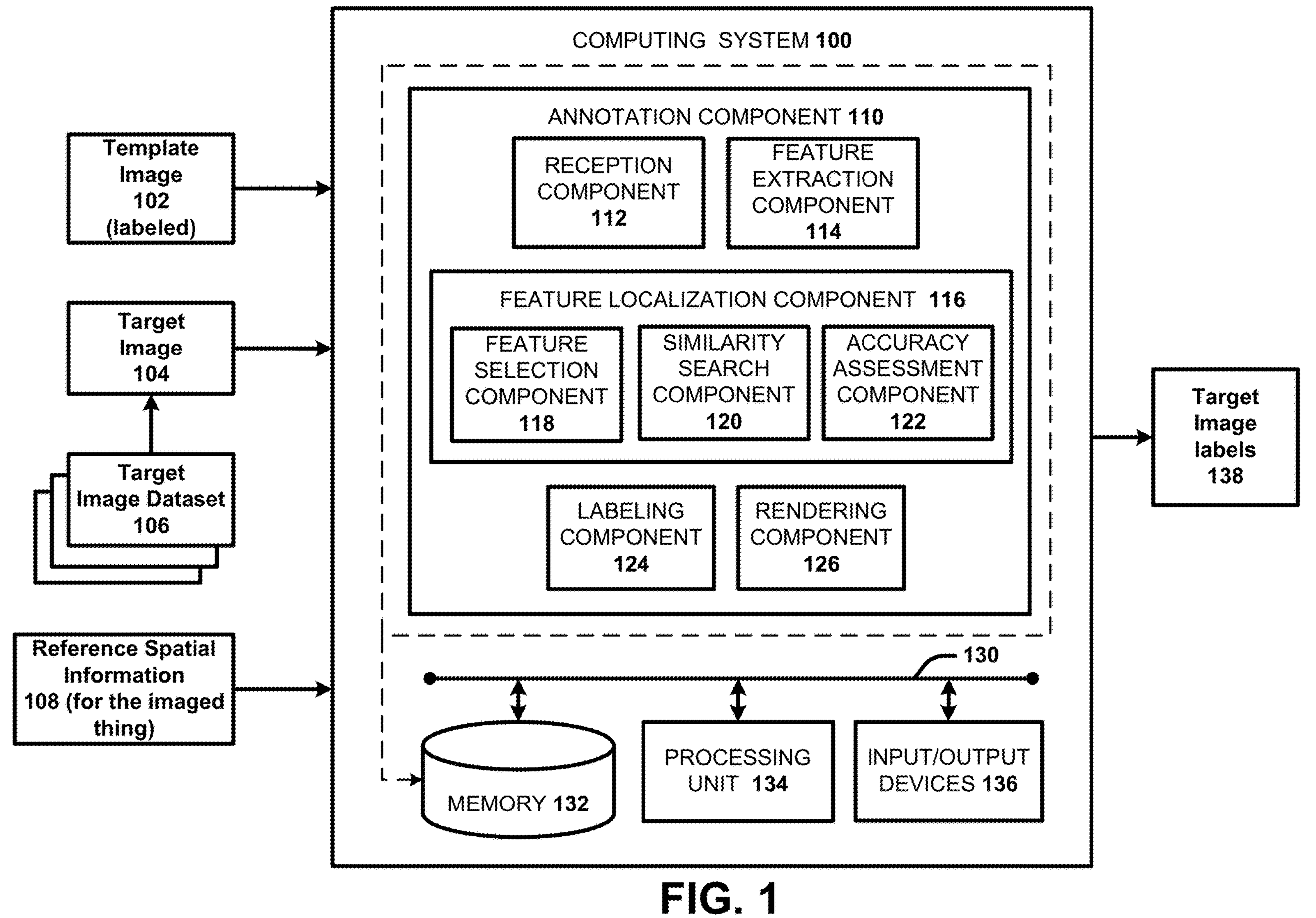
FIG. 1 illustrates a block diagram of an example, non-limiting computing system that facilitates combining domain knowledge and foundation models for one-shot medical image feature localization, in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The subject disclosure provides systems, computer-implemented methods, apparatus and/or computer program products that facilitate one-shot medical image feature localization using pretrained foundation models and domain knowledge. In machine learning (ML) and computer vision, one-shot localization refers to the capability of a model to accurately identify and localize an object or region of interest (ROI) s in target images with just one example labeled training image. One-shot localization aims to address scenarios where only limited amounts of annotated training data is available, making it more efficient for applications where acquiring extensive labeled datasets is challenging, such as in medical imaging applications and others. In the context of medical image annotation, one-shot localization refers to the task of annotating (e.g., identifying and localizing) one or more features and/or ROIs depicted in a plurality of medical images using a single annotated template image with the corresponding features/ROIs and their locations marked/labeled in the template image. This annotation process involves using one or more automated solutions to identify and mark the particular locations of the one or more features/ROIs directly in the medical images.

Foundation models (FM) s based on vision transformers (ViTs) and diffusion models have been used for image correspondence tasks on natural images. These FMs benefit from deriving knowledge from tens of millions of natural images and text data. The term "natural image" is used herein to refer to any image that is not a medical image. For example, natural images generally include images that a human being would observe in the real world, such as landscapes, indoor scenes, roads, mountains, beaches, people, animals, automobiles, etc., as opposed to medical images captured via any existing or future medical image acquisition device or system (and synthetic version of medical images). In recent times, these FMs, pretrained on natural images, have shown amazing capacity to extract meaningful sub-pixel level features of medical images and have been used for few shot localization and segmentation tasks in medical images. To this end, few shot localization refers to using a few (e.g., two or more) labeled template images as opposed to a single template image. The general methodology for this family of methods is to use the patch level features from ViT based networks or intermediate level features from diffusion models and perform interpolation to obtain pixel level features for images. Given a labeled template image and the corresponding pixel locations of a feature/ROI of interest, a similar feature/ROI can be identified and localized in a target image. This is done by performing a similarity search on the template image pixel features with features of all pixels in target image, hence, identify the most similar region in the target image.

Such a method, though effective for some medical image feature localization tasks, face challenges in accurately localizing features within the target image having similar visual characteristics. One example of such features includes the different vertebrae of the spine. For example, with most medical imaging modalities, such as X-ray (XR), magnetic resonance (MR), computed tomography (CT), and others, different vertebrae appearing in images of the spine have very similar pixel features (e.g., similar coloring, contrast, density, geometry, etc.). Other examples of such features include, (but are not limited to), respective phalanges of the hands and feet, teeth, and ribs, among others. In these scenarios, it can be difficult to accurately differentiate between different target features in association with localizing the target features based on their respective pixel signatures.

To mitigate this issue, the disclosed subject matter provides techniques to improve one-shot localization of target features in medical images using a combination pretrained FMs on natural images and reference spatial information indicating the relative spatial positions of the target features to one another and/or other anatomical landmarks with respect to the imaged anatomical region. In this regard, the reference spatial information can include domain knowledge for the imaged anatomical region that defines or indicates the relative positions (e.g., distances, angles, etc.) between the target features and other features in the anatomical region. For example, as applied to the human spine, the domain knowledge can define the standard anatomical structure of the human spine, including the relative positions of the different vertebrae and discs, the standard spacing between the vertebrae and the discs, the standard angles between the vertebrae and discs and so on. The reference spatial information can also include known or predicted positions of reference features identified within the target image.

In this regard, in some embodiments, the disclosed techniques leverage domain knowledge regarding the relative spatial positions between the target anatomical features to sequentially localize and label the target features in the target image. In accordance with these techniques, once an initial target feature is localized, the position of this target feature can be used as a reference to facilitate localizing the next target feature based on domain knowledge defining or indicating the relative relationship (e.g., distance, angle, etc.) position between the respective features. For example, as applied to spine labeling, this can involve sequentially localizing and labeling the vertebrae in order of their standard anatomical progression and ensuring the relative positions of all labeled vertebrae adhere to standard anatomical spatial arrangement of the spinal vertebrae (e.g., each vertebra is positioned between upper and lower discs, L2 is always positioned between L1 and L3, L2 should be less than n distance away from L1 and L3, L2 should be oriented at angle m relative to L3, and so on).

In some implementations of these embodiments, the reference spatial information can also be used to restrict the portion of the target image searched in association with matching reference pixels of each target feature to the corresponding pixels in the target image. For example, as applied to spine labeling, in association localizing a target vertebra having a known position at or near the base of the spinal column, such as S1 for example, the disclosed techniques can restrict the search region to include only a lower region of the target image (given the known anatomical orientation of the imaged anatomy within the target image). In other implementations of these embodiments, in association with sequentially labeling the target features, the location of a previously located target feature can be used to define the search region for the next target feature based. For example, in some embodiments, this can involve cropping the target image to exclude pixels corresponding to the previously located target feature, thus progressively cropping the search region to exclude previously located target features until the last target feature is localized. In other embodiments, this can involve, for each current target feature to be localized, defining a restricted search region within the target image based on the position of the last localized target feature and a known spatial relationship (e.g., relative distance/angle as provided in the domain knowledge) between the last localized target feature and the current target feature. For example, as applied to spine labeling, the restricted search region may be controlled as a function of a maximum observed distance (e.g., as defined in the reference spatial information) between the last localized vertebrae and the current target vertebra to be localized.

Additionally, or alternatively, in addition to the target features, the template image can include labels for other spatially relevant landmarks, such as discs located on adjacent sides of each vertebra as applied to spine labeling. With these embodiments, the other spatially relevant landmarks can provide additional visual context for the target features in association with matching the pixels associated with the target features of the template image to corresponding pixels in the target images.

To this end, the disclosed techniques improve the accuracy of automated (e.g., deep-learning model based, machine learning model based, etc.) feature localization in medical images by leveraging spatially relevant alternative landmarks surrounding the features/ROIs and/or using implicit knowledge about the domain (e.g. relative distances/angles between different features/landmarks for the imaged anatomy). In this regard, by leveraging spatially relevant information, the disclosed techniques enable a plurality of different anatomical features included in the same target medical image to be automatically localized and labeled with high accuracy using pretrained feature extraction models and a single labeled reference image (i.e., one shot-localization). Moreover, the same, high level of accuracy can be repeatedly achieved in association with localizing and labeling the set of anatomical features as respectively included in a plurality (e.g., hundreds, thousands, hundreds of thousands, millions, etc.) of medical image corresponding to the target medical image (e.g., with respect to depicting the same anatomical region and modality yet captured from different subjects or the same subject at different times).

In this regard, by enabling the ability to accurately localize and label multiple anatomical features in a plurality of target images using only a single reference image (i.e., one shot-localization) and pretrained foundation models, the disclosed techniques, eliminate the costs incurred by manual annotation, as well as significantly reduce costs associated with developing and employing automated deep-learning models to perform the same task. For example, the same task could be achieved by training separate deep-learning models to localize and label different anatomical features respectively included in target medical images. However, this process requires labeled ground truth medical images for a plurality of training images and for each different target anatomical feature, which can be difficult and expensive to obtain. With respect to model deployment (e.g., usage of the respective models to perform automated multi-feature labeling in a plurality of target medical images), this process also incurs significant computational costs with respect to the amount of memory storage required to store a plurality of separate models, and the amount of processing time and processing power required to execute the plurality of separate models. On the contrary, the disclosed techniques do not require model training and thus eliminate such costs associated with model development. In addition, by using the same feature extraction model for all anatomical features (as opposed to a plurality of separate models, each tailored to a separate feature), the disclosed techniques significantly reduce computational resource requirements with respect to processing speed, power, and memory storage.

Thus, the disclosed techniques provide a mechanism to accurately and automatically generate multi-feature anatomical labels for a plurality of target images with significantly reduced processing time, computational resources, and financial costs. This will accelerate the development of medical image inferencing models relying of labeled images. For example, in various embodiments, the disclosed techniques can be applied to automatically label different vertebrae and discs in medical images of the spine. Spine labelling is a step for several tasks such as scan planning, abnormality detection, associating image regions with mentions in clinical reports and others. Thus, automating spine labeling with higher accuracy, reduced costs, and faster processing time can lead to significant benefits.

Although various embodiments of the disclosed subject matter are described with respect to spine labeling, it should be appreciated that the disclosed techniques are not limited to spine labeling and can be applied for localizing target features associated with other anatomical regions of the body (e.g., the human body as well as animals and other subjects). As noted above, the disclosed techniques are particularly useful with respect to localizing anatomical features having similar visual characteristics in medical images (e.g., vertebrae, spinal discs, respective phalanges of the hands and feet, teeth, and ribs, among others) based on leveraging known and consistent spatial relationships between the anatomical features across all subjects. In this regard, although medical images captured from different subjects will vary from subject to subject, the same anatomical region imaged will generally at least adhere to the known anatomical structure of the corresponding anatomy (although outlier cases are to be expected). To this end, the disclosed techniques can also be applied for feature localization in non-medical images where the target features in the images all adhere to the same, known spatial relationships.

The term "medical image data" is used to refer to image data that depicts one or more anatomical regions of a patient.

Reference to a medical image or medical image data herein can include any type of medical image associated with various types of medical image acquisition/capture modalities. For example, medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. Medical images can also include synthetic versions of native medical images such as augmented, modified or enhanced versions of native medical images, augmented versions of native medical images, and the like generated using one or more image processing techniques. In some embodiments, the term "image data" can include the raw measurement data (or simulated measurement data) used to generate a medical image (e.g., the raw measurement data captured via the medical image acquisition process).

The terms "algorithm" and "model" are used herein interchangeably unless context warrants particular distinction amongst the terms. The terms "artificial intelligence (AI) model" and "machine learning (ML) model" are used herein interchangeably unless context warrants particular distinction amongst the terms. Reference to an AI or ML model herein can include any type of AI or ML model, including (but not limited to): deep learning (DL) models, neural network models, deep neural network models (DNNs), convolutional neural network models (CNNs), generative adversarial neural network models (GANs), transformer models, and the like. An AI or ML model can include supervised learning models, unsupervised learning models, semi-supervised learning models, combinations thereof, and models employing other types of ML learning techniques. An AI or ML model can include a single model or a group of two or more models (e.g., an ensemble model, chained models, or the like).

The term "image inferencing model" is used herein to refer to an AI/ML model adapted to perform an image processing or analysis task on image data. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image inferencing models described herein can include two-dimensional (2D) image processing models as well as three-dimensional (3D) image processing models. The image processing model can employ various types of AI/ML models (e.g., deep learning models, neural network models, deep neural network models, DNNs, CNNs, GANs, etc.). The terms "image inferencing model," "image processing model," "image analysis model," and the like are used herein interchangeably unless context warrants particular distinction amongst the terms.

As used herein, a "medical imaging inferencing model" refers to an image inferencing model that is tailored to perform an image processing/analysis task on medical image data. For example, the medical imaging processing/analysis task can include (but is not limited to): disease/condition classification, disease region segmentation, organ segmentation, disease quantification, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 presents illustrates a block diagram of an example, non-limiting computing system 100 that facilitates combining domain knowledge and foundation models (FM) s for one-shot medical image feature localization, in accordance with one or more embodiments of the disclosed subject matter. Computing system 100 can include or correspond to one or more computing devices, machines, virtual machines, computer-executable components, datastores, and the like that may communicatively coupled to one another either directly or via one or more wired or wireless communication frameworks.

Computing system 100 can include machine-executable (i.e., computer-executable) components or instructions embodied within one or more machines (e.g., embodied in one or more computer-readable storage media associated with one or more machines) that can perform one or more of the operations described with respect to the corresponding components. For example, computing system 100 can include (or be operatively coupled to) at least one memory 132 that stores computer-executable components and at least one processor (e.g., processing unit 134) that executes the computer-executable components stored in the at least one memory 132. These computer-executable components are collectively embodied as annotation component 110 and can include (but are not limited to) reception component 112, feature extraction component 114, feature localization component 116 (including feature selection component 118, similarity search component 120 and accuracy assessment component 122), labeling component 124, and rendering component 126. Examples of said memory 132 and processing unit 134 as well as other suitable computer or computing-based elements, can be found with reference to FIG. 12 (e.g., system memory 1206 and processing unit 1204 respectively), and can be used in connection with implementing one or more the components shown and described in connection with FIG. 1, or other figures disclosed herein.

Computing system 100 can further include one or more input/output devices 136 to facilitate receiving user input and rendering data to users in association with performing various operations described with respect to the machine-executable components and/or processes described herein. Suitable examples of the input/output devices 136 are described with reference to FIG. 12 (e.g., input devices 1228 and output device 1236). Computing system 100 can further include a system bus 130 that couples the memory 132, the processing unit 134 and the input/output device 136 to one another.

In various embodiments, the annotation component 110 can facilitate automatically (e.g., without manual involvement) localizing and labeling one or more target features included in a target image 104 based on a template image 102 and reference spatial information 108 for the imaged thing. In various embodiments, the imaged thing comprises an anatomical region of the human body and the template image 102 and target image 104 respectively comprise medical images of the anatomical region as captured from different subjects. The type of the medical images can vary (e.g., XR images, CT images, MR images, etc.) and the anatomical region can vary. For example, in some embodiments, the anatomical region comprises a region of the human spine, such as the lower lumbar region, the cervical region, the entirety of the spine, or another region of the spine. With these embodiments, the target features can include vertebrae and/or spinal discs. However, the anatomical region and the target features can vary and is not limited to the spine and vertebrae/discs. In this regard, the anatomical region can include any region of the human body or another body of another living being (e.g., an animal, an insect, a plant, etc.). The imaged thing can also include other physical objects and/or environments. To this end, regardless of the type of the imaged thing, the template image 102 and the target images 104 can respectively depict different images of the same type of imaged thing (e.g., medical images of the same anatomical region captured from different subjects), or the same imaged thing yet vary with respect to different imaged versions of the same imaged thing (e.g., medical images of the same anatomical region captured from the same subject yet at different times, under different acquisition parameters, using different modalities, etc.).

To this end, the input to annotation component 110 can include a template image 102, a target image 104, and reference spatial information 108, and the output can include target image labels 138. The target image labels 138 can include or correspond to annotation data associated with the target image 104 identifying one or more target features included in the target image 104 and their respective positions or locations in the target image 104. For example, in some implementations, the target image labels 138 can include visual markings applied to the target image 104 marking the positions of the target features on/within the target image 104. Additionally, or alternatively, the target image labels 138 can include text data associated with the target image 104 (e.g., as metadata or the like) identifying the spatial coordinate positions of the respective target features on/within the target image 104 (e.g., in 2D as applied to 2D images or 3D as applied to 3D images). In some implementations, the annotation data 138 can also include additional spatial information determined for the target features by the annotation component 110 (as described below), such as measured distances and angles between target features and measurements of the target features themselves (e.g., dimensions, geometry, etc.).

The template image 102 corresponds to labeled image with corresponding annotation data associated therewith. In this regard, the template image 102 can include or be associated with reference annotation data identifying one or more target features included in the template image 102 and their respective positions or locations in the template image 102. To this end, the template image 102 provides the ground truth information for target features to be localized within the target image 104 and additional target images corresponding to the target image 104. For example, in various embodiments, the target image 104 can be included in a target image dataset 106 comprising a plurality of different images corresponding to the target image 104 and the reference image 102, such as a plurality of different medical images of the same capture modality depicting the same anatomical region yet captured from different subjects. In this regard, the annotation component 110 can generate target image labels 138 for each of the target images 104 included in the target image dataset 108 using the same, single template image 102 (i.e., one-shot localization) and the reference spatial information 108.

The reference spatial information 108 can include domain knowledge for the imaged thing that defines or indicates the relative positions or spatial relationships (e.g., distances, angles, etc.) between the target features (and in some implementations other features) with respect to the imaged thing. For example, as applied to medical images depicting an anatomical region of the body, the domain knowledge can define standard anatomical relationships between different anatomical features depicted in the anatomical region as they appear in the medical images, such as relative positions (e.g., distances, angles, and/or orientations) between different pairs of anatomical features. For instance, as applied to the human spine, the domain knowledge can define the standard anatomical structure of the human spine, including the relative positions of the different vertebrae and discs, the standard spacing between the vertebrae and the discs, the standard angles between the vertebrae and discs and so on. Additionally, or alternatively, the reference spatial information 108 can include domain knowledge for the imaged thing that defines or indicates the relative positions or spatial relationships (e.g., distances, angles, and/or orientations) between the target features (and in some implementations other features) with respect to how they appear in the target images as scaled or calibrated based on the image dimensions, the perspective of the imaged anatomy/thing, and as a function of the image capture modality.

In this regard, the reception component 112 can receive or otherwise obtain the template image 102, the target image 104, the target image dataset 108 and the reference spatial information 108 for processing by the annotation component 110. It should be appreciated that any information received and/or generated by the computing system 100 can be stored locally (e.g., in memory 132), rendered (e.g., via rending component 126 and display device of the input/output devices 136), and/or provided (e.g., transmitted, sent, etc.) to another device/system via any suitable wired or wireless communication technology.

In various embodiments, the annotation component 110 generates the target image labels 138 for each target image 104 using a one-shot localization process that involves using one or more feature extraction models (e.g., feature extraction models 206 illustrated in FIG. 2) to generate pixel feature data for the template image 102 and each target image 104. In some embodiments, the template image 102 and each target image 104 may be received as already processed by the one or more feature extraction models. With these embodiments, the pixel feature data for the respective images can be received with the respective images (e.g., as metadata and/or a paired separate data file). Additionally, or alternatively, the feature extraction component 114 can apply the one or more feature extraction models to generate the pixel feature data for the template image 102 and/or each target image 104. With these embodiments, the one or more feature extraction models can be stored in memory 132 and/or at another system device and accessed/applied to the respective images by the feature extraction component 114 using corresponding network communication technologies.

Figure 2:
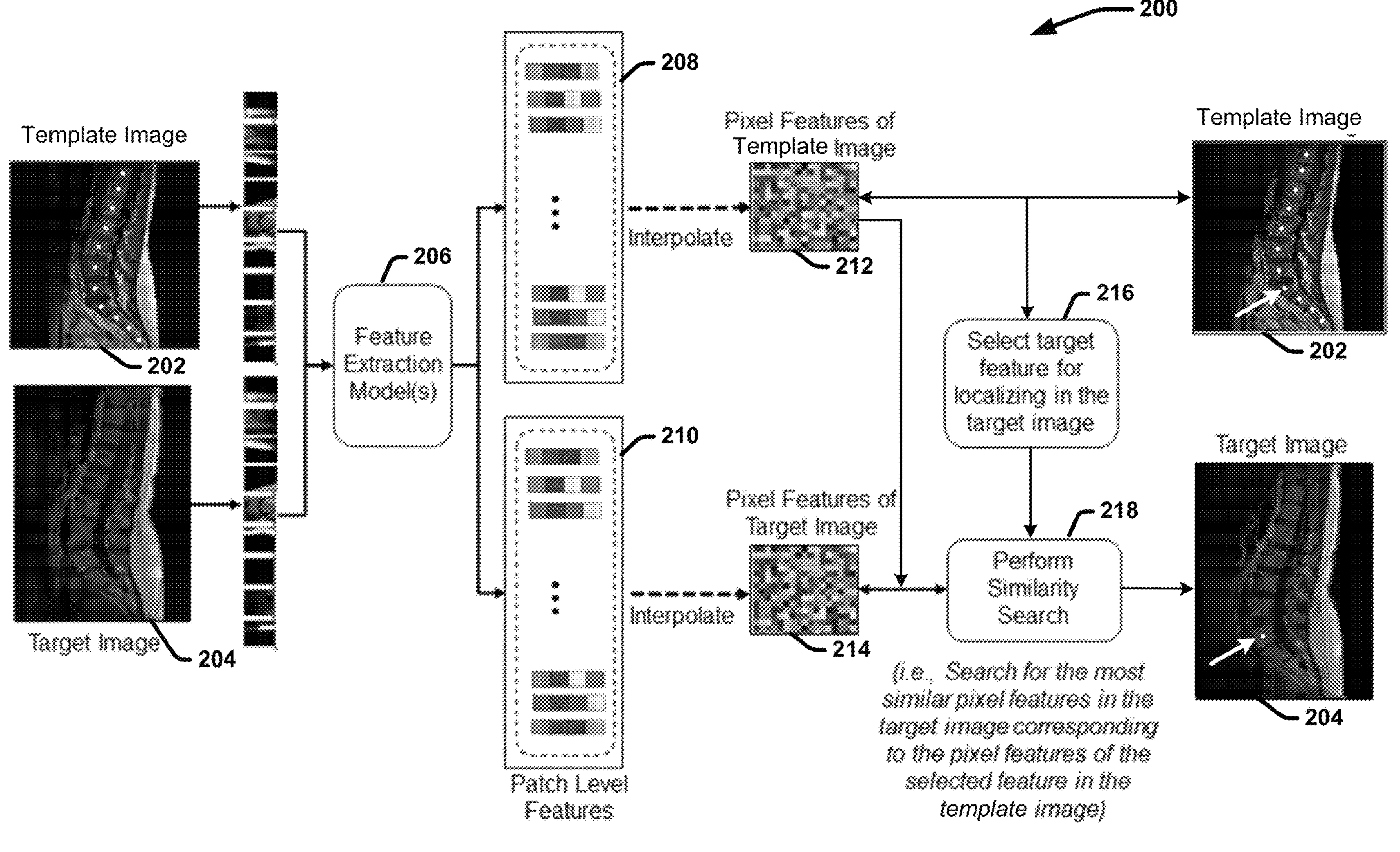
FIG. 2 illustrates an example one-shot medical image localization process using pretrained feature extraction models, in accordance with one or more embodiments of the disclosed subject matter.

In various embodiments, the one or more feature extraction models can include or correspond to one or more pretrained FMs trained on natural images, such as one or more FMs based on ViTs and/or diffusion models. These FMs benefit from deriving knowledge from tens of millions of natural images and text data and have shown amazing capacity to extract meaningful sub-pixel level features of medical images. The general methodology for these FMs is to use the patch level features from ViT based networks and/or intermediate level features from diffusion models and perform interpolation to obtain pixel level features for the image, as illustrated in FIG. 2. Additionally, or alternatively, the one or more feature extraction models can include or correspond to one or more pretrained feature extraction models trained on medical images. Such feature extraction models can employ same or similar feature extraction techniques employed by pretrained FMs on natural images.

In this regard, FIG. 2 illustrates an example, one-shot image feature localization processes 200 using one or more feature extraction models 206 in accordance with one or more embodiments of the disclosed subject matter. In various embodiments, the one or more feature extraction models 206 include or correspond to one or more pretrained FMs (trained on natural images), such as one or more ViTs and/or one or more diffusion models. Process 200 illustrates how these feature extraction models 206 can be used to generate pixel feature data for a template image 202 and a target image 204 (e.g., pixel feature data 212 and pixel feature data 214, respectively) in association using the pixel feature data for one-shot localization of one or more target features included in the target image 202. In this example, the template image 202 and the target image 204 respectively correspond to MR images of the lumber region of the human spine captured from different subjects, and the target features include vertebrae of the lumber spine region.

With reference to FIGS. 1 and 2, in various embodiments, template image 202 corresponds to an example template image 102 and target image 204 corresponds to an example target image 104. As illustrated in FIG. 2, the template image 202 includes white dots marking respective positions of the vertebrae. These white dots correspond to the ground truth annotation data applied to the template image 202 (e.g., via manual annotation). For example, the white dots can respectively correspond to overlay data that has been overlaid on template image 202. Each white dot can further include or be paired with information identifying the corresponding vertebra identifier (e.g., in accordance with a standard medical nomenclature). The ground truth annotation data applied to the template image 202 (and/or template image 102) is removed from the template image 202 in association with processing the template image 202 via the one or more feature extraction models 206 to generate the pixel feature data 212 for the template image.

In accordance with process 200, the template image 202 and the target image 204 are respectively (separately) processed via the one or more feature extraction models 206 to generate patch level features for the respective images (e.g., patch level features 208 and patch level features 210, respectively). The patch level features are then interpolated to obtain the pixel level features for the respective image (e.g., pixel features 212 and pixel features 214, respectively).

In accordance with the disclosed techniques, each target image 104 can be processed in this manner (e.g., vi the feature extraction component 114 or by another system/device prior to reception by the annotation component 110) to generate pixel features for each target image. As only a single template image is used for the disclosed one-shot localization techniques, this feature extraction process is performed for the template image 102 only once (e.g., via the feature extraction component 114 and/or by another system/device prior to reception of the template image 102 via the annotation component 110).

Once the pixel features for the template image 102 and the target image 104 have been generated or obtained, the feature localization component 116 can employ them to localize (i.e., determine the positions of) the target features in the target image 104 based on matching similar pixel features using a pixel similarity matching process performed by the similarity search component 120. In this regard, given a labeled template image 102 marking the positions of the target features on the template image, the respective pixel features of the template image pixel data (e.g., pixel data 212) belonging to each target feature can be identified and/or extracted (e.g., via feature extraction component 114 or by another system/device and received with the template image 102). In this regard, in some embodiments, reference pixel features can be defined (e.g., via feature extraction component 114 or by another system/device and received with the template image 102) for each target feature as included in the template image 102. The reference pixel features for each target feature thus include or correspond to a localized subset (comprising one or more) of the template image pixel features belonging to the corresponding labeled target feature, and/or a representation of the localized subset (e.g., a feature vector, a feature matrix, or another suitable feature representation). In this regard, given the reference pixel features defined for or otherwise associated with each target feature labeled in the template image 102, the corresponding target features as depicted in the target image 104 may be identified and localized by performing a similarity search (e.g., via similarity search component 120) between the reference pixel features and the target image pixel features and identifying most similar regions (i.e., comprising a subset of pixels) of the target image 104 corresponding to each of the reference pixel features.

For example, in accordance with process 200, at 216 the feature selection component 118 can select a target feature for localizing in the target image 204. This can involve using the labeled annotation data associated with the template image 202 and selecting one of the labeled target features for localizing in the target image 204. In some embodiments, the feature selection process can be controlled, as described in greater detail below. For now, let's assume the feature selection component 118 randomly selects one of the labeled target features from the template image 202, which as illustrated in process 200 corresponds to the vertebra marked with the white arrow in the template image 202 shown on the right side of FIG. 2. In association with selecting this target feature, at 216 the feature selection component 210 can identify or otherwise obtain the subset of pixel features (e.g., a reference feature vector or the like) in the template image pixel features 212 corresponding to the marked position of the selected vertebra in the template image 202. This subset can be referred to as the reference subset and/or can correspond to a reference pixel feature representation (e.g., a feature vector, a feature matrix, a feature signature, etc.) of the selected target feature. At 218, the similarity search component 120 can perform a similarity search between the reference subset of pixel features from the template and the pixel features of the target image 214. This can involve searching for the most similar subset of pixels features in the target image 204 corresponding to the reference subset (e.g., determined using one or more pixel-based similarity assessment measures). To this end, process 200 assumes the position of the most similar subset of pixel features in the target image 204 corresponds to the position of the target feature as included in the target image 204. Once identified and localized the position of the target feature in the target image can be labeled and/or marked (e.g., via labeling component 124) on the target image, as shown in FIG. 2 via the white dot and arrow associated with the target image 204 on the right side of FIG. 2. Process 200 is exemplified as applied to localize a single selected target feature of the labeled target features in the template image 202. It should be appreciated that in some embodiments, the feature selection at 216 and the similarity search at 218 can be repeated and/or performed in parallel for all the target features labeled in the template image 202 to localize and label each target feature in the target image 204.

Although process 200 is effective for some medical image feature localization tasks, process 200 faces challenges in accurately localizing features within a target image having similar visual characteristics, such as vertebrae and spinal discs. In these scenarios, it can be difficult to accurately differentiate between different target features in association with localizing the target features based on their respective pixel signatures, as illustrated in FIG. 3.

Figure 3:
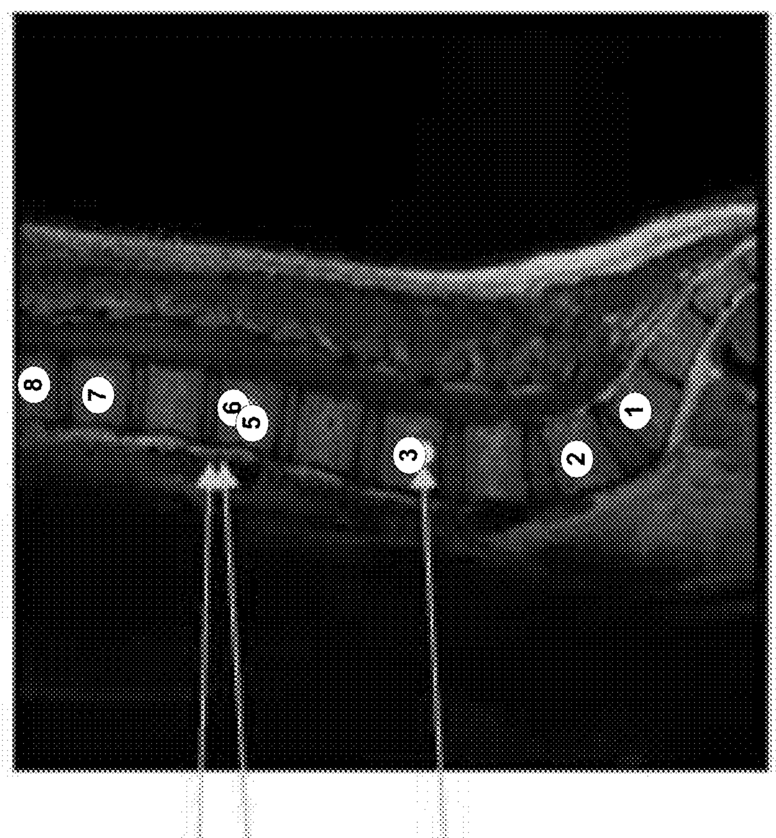
FIG. 3 demonstrates errors associated with using pretrained foundation models for one-shot spine labeling, in accordance with one or more embodiments of the disclosed subject matter.
Figure 3:
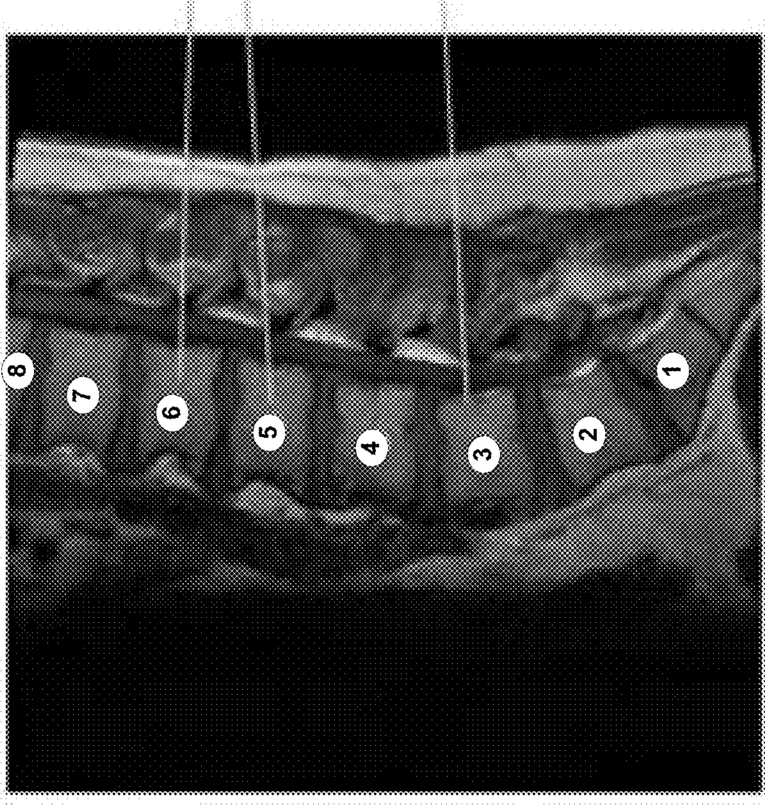

FIG. 3 demonstrates errors associated with using pre-trained FMs for one-shot spine labeling, in accordance with one or more embodiments of the disclosed subject matter. With reference to FIG. 3 in view of FIGS. 1 and 2, FIG. 3 presents an example result of process 200 as applied to localized and label different vertebrae in the lumber station of the spine. The template image 202 as shown in FIG. 3 includes the ground truth labels marking the positions of the respective vertebra. The reference numbers 1-8 are used for ease of illustration to identify each different vertebra. It should be appreciated that the actual term/name/identifier for the corresponding numbered vertebra can follow a standard medical nomenclature. The target image 204 includes labels for the vertebrae as determined and applied to the target image 204 in accordance with process 200. As can be seen via comparison of the vertebrae labels on the template image 202 with the corresponding labels on the target image 204, process 200 can result in mislabeling of the vertebra, owing to the similarities between pixel signatures associated with the respective vertebrae.

Figure 4:
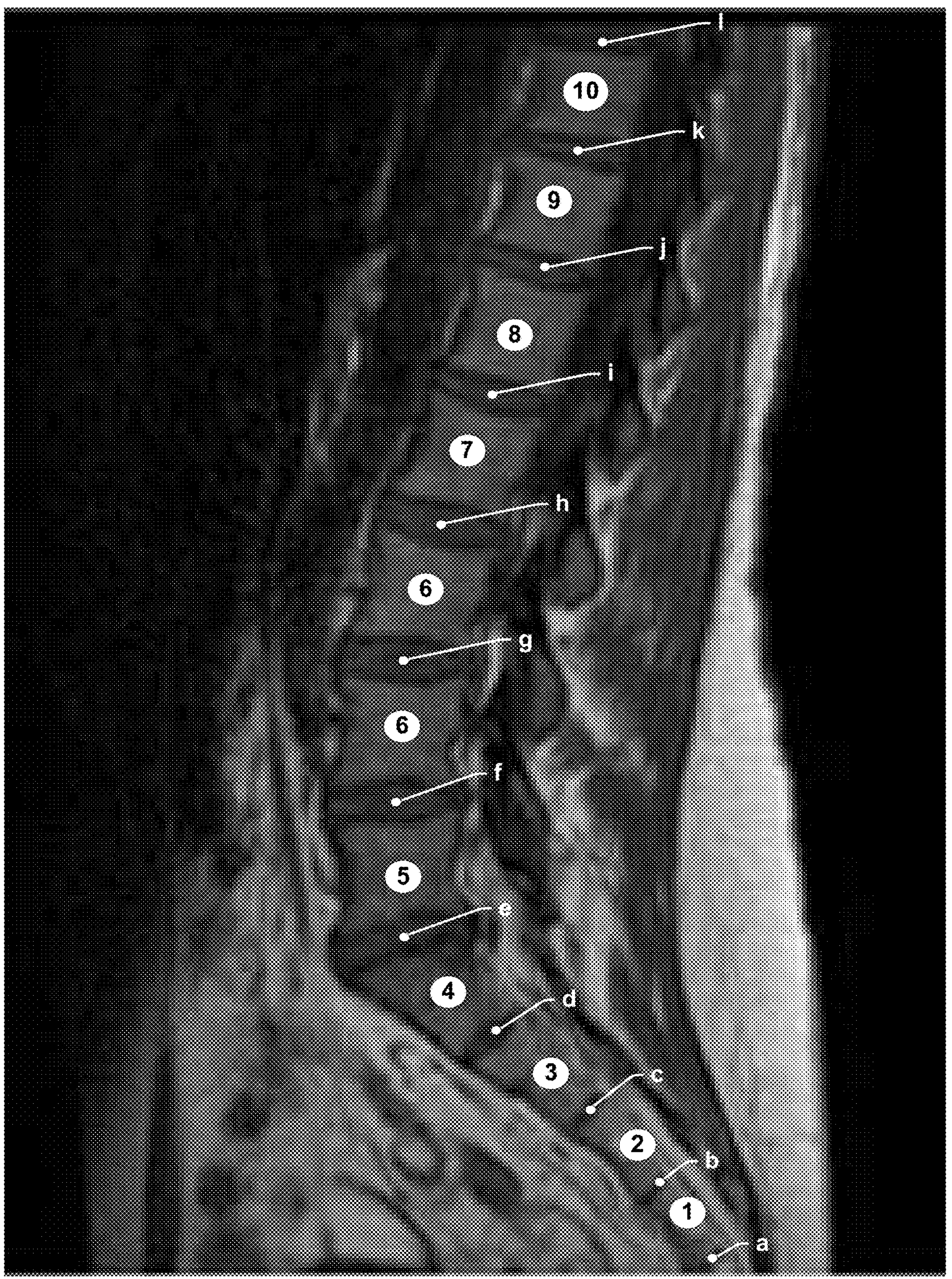
FIG. 4 presents an example template image with both target features and spatially relevant landmarks labeled, in accordance with one or more embodiments of the disclosed subject matter.

To mitigate this issue, in some embodiments, in addition to the target features, the template image 102 can include labels for one or more other spatially relevant landmarks respectively appearing in the template image 102 and the target images 104. To this end, the labels for the other spatially relevant landmarks can define the position and identity (e.g., using corresponding identifiers) of the other spatially relevant landmarks on or within the template image 102. In some implementations as applied to medical images, the other spatially relevant landmarks can include one or more other anatomical features and/or ROIs located adjacent to each (or some of) the target features. For example, as applied to spine labeling, this can include discs located on adjacent sides of each vertebra, as illustrated in FIG. 4. In this regard, FIG. 4 presents another example template image 402 corresponding to template image 202 yet with the positions and identities of the different spinal discs. In this example, the different spinal discs are respectively identified with lowercase letters a-l for ease of description. However, it should be appreciated that the respective spinal discs a-l can be labeled or associated with different identifiers corresponding to a standard medical nomenclature for the respective discs.

In some implementations of these embodiments, the other spatially relevant landmarks can provide additional visual context for the target features in association with matching the pixels associated with the target features of the template image 102 to corresponding pixels in the target images 104 by the similarity search component 120. For example, as applied to process 200 using template image 402 as opposed to template image 202, in association with localizing a selected vertebrae in the target image 202, let's say for instance the vertebra corresponding to vertebra labeled 4 in template image 402, as opposed to matching only the subset of the template image pixel features corresponding to vertebra 4 to the corresponding pixels in the target image 202, the similarity search component 120 can use the subset of the template image pixels corresponding to vertebra 4 and the spinal discs located on opposite sides of vertebra 4, that is spinal discs d and e. To this end, the unique reference pixel feature representation for vertebra 4 would include pixels from vertebra 4 and pixels from spinal discs e and d. Accordingly, a match between the unique reference pixel representation for vertebra 4 in this example would include the most similar pixels in the target image 204 corresponding to the template image vertebra 4 and the discs e and d. To this end, in some implementations, the template image 102 can include (or be associated with) reference annotation data (i.e., labels) identifying the positions of target features and one or more other features located adjacent to the respective target features. The similarity search component 120 can further localize each target feature in the target image 104 (i.e., determine the position thereof) based on matching a reference feature representation for each target feature to the most similar pixel region in the target image 102, wherein the reference feature representation comprises template image pixel features belonging to the target feature and one or more adjacent features to the target feature as included in the template image 102.

To this end, the matched (i.e., the most similar) pixel region in the target image 104 should include pixels corresponding to the target feature and the adjacent feature(s). In some embodiments, the feature localization component 116 can further determine and set the position of each (or some) target feature within the matched pixel region in the target image 104 based on reference spatial information (e.g., included in reference spatial information 108) for each target feature that defines one or more reference spatial relationships between the target feature and the adjacent features. For example, as applied to spinal discs, the reference spatial information 108 for each target vertebra can define the relative distance, angle and orientation between the target vertebra and the adjacent discs, and the feature localization component 116 can constrain the position of the target vertebra within the matched pixel region accordingly. In another example, one or more reference spatial relationships can constrain the position of the target feature within each matched pixel region based on defined parameters (e.g., included in the reference spatial information 108) that account for the standard or known (e.g., domain accepted) spatial relationship between the target feature and the adjacent feature(s). For example, in some implementations as applied to vertebra, the defined parameters can constrain the position of each vertebra to be the center point of the matched pixel region. In some implementations of these embodiments, in addition to localizing the localized target feature in the target image 104 (e.g., vertebra 4 in the above example), the feature localization component 116 can also localize the associated one or more other relevant landmarks (e.g., discs e and d in the above example). Still in other embodiments, the labeled discs themselves can correspond to target features.

Once the feature localization component 116 has determined the positions of the target features in the target image 104, the labeling component 124 can generate label data for the target features (e.g., target image labels 138) identifying the target features and their respective positions in the target image 104. The labeling component 124 can further associate the label information with the target image and save the label information with the target image (e.g., in memory 132 or another suitable memory device). For example, in some embodiments, the target image labels 138 can include or correspond to overlay data (e.g., visual symbols, text data, etc.) that is applied to the target image via the labeling component 124 as spatially aligned with the respective target features and saved with the target image, thereby transforming the target image into a labeled target image (e.g., a modified version of the target image). Additionally, or alternatively, the overlay data can be associated with the target image as metadata and/or in a separate label file generated for the target image. The rendering component 126 can further render the target image and/or the labeled target image for clinical usage (e.g., reviewing by radiologists, planning, diagnosis, etc.). The labeled target images can also be used as training datasets for training various medical image inferencing models to automatically perform various clinical tasks related to the labeled features (e.g., diagnosis and staging, segmentation, etc.).

In one or more additional or alternative embodiments, to improve the accuracy of the one-shot localization process 200, the similarity search component 120 can use the reference spatial information 108 to restrict the portion of the target image 104 searched in association with matching reference pixels for each target feature to the corresponding pixels in the target image 102. In this regard, in some implementations of process 200, the similarity search performed at 218 can involve comparing the reference pixels for a target feature to all of the pixels in the target image in association with finding the most similar matching pixel region in the target image 204. In accordance with one or more alternative embodiments, the similarity search component 120 can restrict the region of the target image searched based on a known relative position of the target feature within the target image 102, as defined in the reference spatial information 108. This can involve defining a search region within the target image 102 based on the known relative position and performing the pixel matching between the reference pixel feature for the target feature and only the portion of the target image pixels included within the search region, the search region comprising a portion of the target image 104. For example, as applied to spine labeling, in association localizing a target vertebra having a known position at or near the base of the spinal column, such as S1 for example, the similarity search component 120 can define (and/or the reference spatial information can define) the search region for S1 to include only a lower region of the target image (given the known anatomical orientation of the imaged anatomy within the target image).

To this end, in some embodiments, the reference spatial information 108 can define default search regions for one or more of the target anatomical features, the default search regions respectively comprising general regions (e.g., general portions) of the target image 102 where each target feature is assumed to be located, and the similarity search component 120 can apply the default search regions in association with performing the pixel similarity matching. The default search regions can be determined and/or defined based on the known or standard spatial arrangement of the target features with respect to the imaged anatomy (or another type of object/environment). The size and position of the default search regions can be tailored based on the imaged anatomy to ensure that the default search region will include the target feature as applied to all of the target images 104 to be annotated.

For example, FIG. 5 presents example medical labels for the lumber spine station vertebra the cervical spine station vertebra as applied to MR images of the respective regions captured from the sagittal plane perspective. As illustrated in FIG. 5, the lumbar region of the human spine as appearing in most medical images of the lumbar region from the sagittal plane perspective includes the sacral base bone, referred to as S1, at the base of the image, followed by the five lumbar vertebrae (L5-L1) extending vertically within the image away from S1. In accordance with this imaged perspective of the lumbar spine, the default search region for S1 can be defined to include a lower portion of the image, such as the lower half of the image or a smaller region. Likewise, the default search region for L1 can be defined to include an upper portion of the image, such as the upper half of the image or a smaller region. The cervical region of the human spine, as appearing in most medical images of the cervical region from the sagittal plane perspective, includes seven cervical vertebrae, respectively referred to a C1-C7, with C1 being the first vertebra positioned at the top of the spinal column and thus the top of the imaged region in the sagittal perspective. In accordance with this imaged perspective of the cervical spine, the default search region for C1 can include an upper portion of the image, such as the upper half of the image or a smaller region.

With reference to FIG. 1 in view of FIGS. 2-5, in one or more additional embodiments, the similarity search component 120 can restrict the search region based on one or more reference positions of one or more reference features that have already been localized within the target image 102. With these embodiments, the feature localization component 116 can perform an iterative feature localization process that involves localizing respective ones of the target features individually and using the determined position of each previously localized target and the reference spatial information 108 to facilitate localizing the next target feature, as illustrated in FIGS. 6-9.

Figure 6:
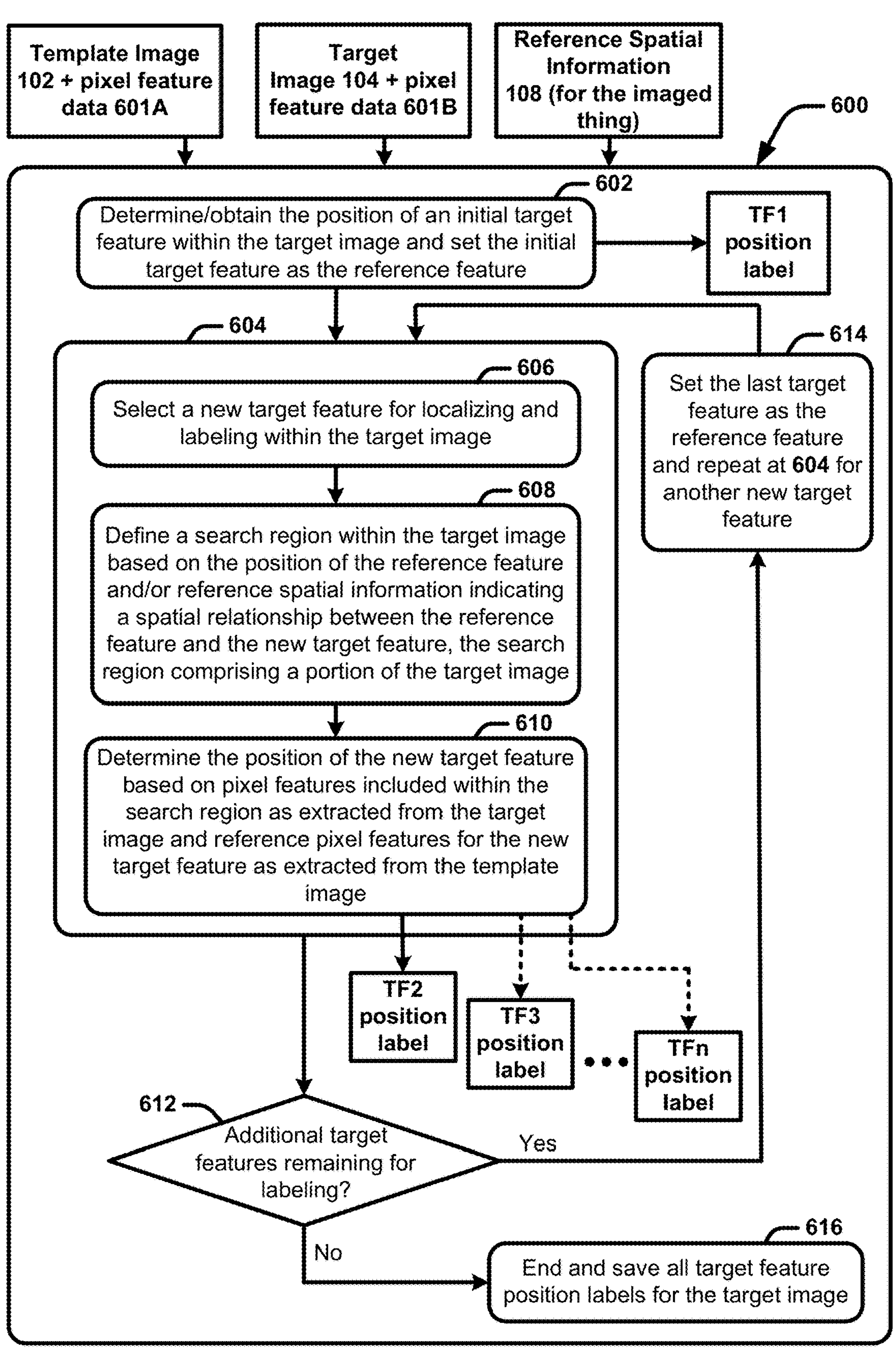
FIG. 6 presents a flow diagram of an example iterative feature localization process, in accordance with one or more embodiments of the disclosed subject matter.

FIG. 6 presents a flow diagram of an example iterative feature localization process 600, in accordance with one or more embodiments of the disclosed subject matter. With reference to FIG. 6 in view of FIGS. 1-5, process 600 is described in association with the pixel feature data (e.g., pixel feature data 601A and pixel feature data 601B) for the template image 102 and the target image 104 having already been generated (e.g., via the feature extraction component 114 or another system/device and received with the respective images). In this regard, the pixel feature data 601A and the pixel feature data 601B can respectively correspond to pixel feature data generated for the respective images using one or more feature extraction models 206. As noted with respect to process 200, in some embodiments, the one or more feature extraction models 206 can include or correspond to pretrained FMs trained on natural images. In some embodiments, the pixel feature data 601A for the template image 102 can include or correspond to respective reference pixel feature representations extracted for each of the target features labeled in the template image 102. In some implementations, each reference pixel feature representation can represent the corresponding target feature only (e.g., a particular vertebra as applied to spine labeling). In other implementations, each reference pixel feature representation can represent the target feature and one or more adjacent features (e.g., at least one disc adjacent to the particular vertebra). The input for process 600 also includes the reference special information 108.

In accordance with process 600, at 602, the feature localization component 116 can determine or obtain the position (e.g., target feature 1, (TF1) position label) of an initial target feature within the target image and set the initial target feature as the reference feature. The position of the initial target feature sets the stage for localizing and spatially aligning the additional target features within the target image. In this regard, if the position of the initial target feature is incorrect, the remaining target features may be mislabeled in accordance with process 600. Accordingly, in some embodiments, the process for determining/obtaining the position of the initial target feature at 602 can be controlled to ensure its position in the target image is correct.

In some embodiments, at 602, the feature selection component 118 can select a predefined target feature as the initial target feature (e.g., as defined in the reference spatial information 108). For example, the predefined initial target feature can correspond to a target feature that has been previously determined to be accurately localized in images corresponding to the target image 104 based on pixel feature matching alone (and/or based on pixel matching and using a default search region for the initial target feature). In another example, in implementations in which the target features are localized via process 600 in accordance with a defined order, the predefined initial target can correspond to the first target feature of the order. For example, as applied spine labeling, and sequentially labeling the vertebrae in accordance with their natural anatomical progression, the initial target feature can be set to be the S1 vertebra for lumbar spine images and the C1 vertebra for cervical spine images. With these embodiments, at 602, the similarity search component 120 can determine the position of the initial target feature based on matching the reference feature pixel representation for the initial target feature to the most similar pixel features in the target image 104, either via searching the entirety of the target image pixel feature data 601B or a default search region defined for the initial target feature.

In other embodiments, the position of the initial target feature can be manually applied to the target image (e.g., via manual annotation). Still in other embodiments, a unique reference feature can be labeled in the template image 102 and serve as an initial reference feature for localizing the target features. For example, in addition to the target feature labels, the template image 102 can also include a label identifying the position of a unique reference feature that also consistently appears in the target images and has a consistent spatial relationship with at least one of the target features. In one example as applied to the lumbar spine region, the unique reference feature can include or correspond to a defined region below S1 having a consistent anatomical relationship relative to S1 across all (or most) imaged variants. With these embodiments, at 602, the similarity search component 120 can determine the position of the unique reference feature based on matching the reference feature pixel representation for the unique reference feature to the most similar pixel features in the target image 104, either via searching the entirety of the target image pixel feature data 601B or a default search region defined for the initial target feature.

Once the position of an initial feature in the target image has been localized (e.g., corresponding to TF1 position label), the remaining of process 600 involves iteratively repeating process 604 until all the target features have been localized in the target image. In some implementations as applied to spine labeling, this can involve sequentially localizing and labeling the vertebrae in order that corresponds to their natural sequential order and ensuring the relative positions of all labeled vertebrae adhere to standard anatomical spatial arrangement of the corresponding spinal vertebrae (e.g., each vertebra is positioned between upper and lower discs, L2 is always positioned between L1 and L3, L2 should be less than n distance away from L1 and L3, L2 should be oriented at angle m relative to L3, and so on).

In this regard, continuing process 600 after determining the TF1 position label, at 606, the feature selection component 118 selects a new target feature for localizing and labeling within the target image 104. In some embodiments, the selection of the new target feature at 606 can be controlled based on the previously localized feature, which at the point in the description of process 600 corresponds to TF1, and the reference spatial information 108. With these embodiments, the reference spatial information 108 can define and/or control the order of target feature selection to be applied by the feature selection component 120 (e.g., at 602 and 606) wherein the order is based on defined spatial relationships between pairs of the target features as defined in the reference spatial information 108. In this regard, in the order in which the respective target features are localized can be tailored based on the particular anatomical region imaged and domain knowledge for the anatomical region.

In some embodiments, the order of target feature selection can be controlled as function of the position of the next target feature having a known adjacent position (e.g., as defined in the reference spatial information) to the previously localized target feature (or features as applied to the vertebra and adjacent disc combination). For example, as applied to spine labeling the order of target feature selection at 606 can follow the natural anatomical progression of the vertebrae relative to TF1 such that the vertebrae are sequentially localized and labeled in order of their standard anatomical progression. In this regard, the order corresponds to a natural sequential order of the vertebrae such that the current target feature and the previously localized target feature comprise adjacent vertebrae. This facilitates ensuring that the relative positions of all labeled vertebrae adhere to standard anatomical spatial arrangement of the spinal vertebrae. For example, as applied to the lumbar spine region and TF1 corresponding to S1, the order of feature selection at 606 can progress in the superior direction of the spine, such that the next target feature is L5, followed by L4, and so on. Likewise, as applied to the cervical spine region and TF1 corresponding to C1, the order of feature selection at 606 can progress in the anterior direction of the spine, such that the next target feature is C2, followed by C3, and so on.

In other embodiments, the order of feature selection at 606 can follow a predefined order, which may not follow the adjacent feature constraint noted above. In some embodiment, the order can be based on known or learned (e.g., via machine learning) information regarding levels of accuracy associated with localizing the different target features based on pixel feature matching alone (e.g., in accordance with process 200), wherein the higher the level of accuracy, the earlier the feature is selected in the progression. In other words, at 606 after localizing TF1, the selection component can select the next "easiest" feature to localize, followed by the second easiest, followed by the third easiest, and so on. For example, with reference again to FIG. 3, let's assume that process 200 consistently results in the vertebrae corresponding to identifiers 1, 2, 7 and 8 more accurately in target images relative to the vertebrae corresponding to identifiers 3-5. In accordance with this example, the order of selection of the respective vertebrae for labeling in accordance with process 600 can place the vertebrae corresponding to identifiers 1, 2, 7 and 8 earlier in the progression order relative to the vertebrae corresponding to identifiers 3-5. Still in other embodiments, the order of feature selection at 606 may be random.

Figure 7:
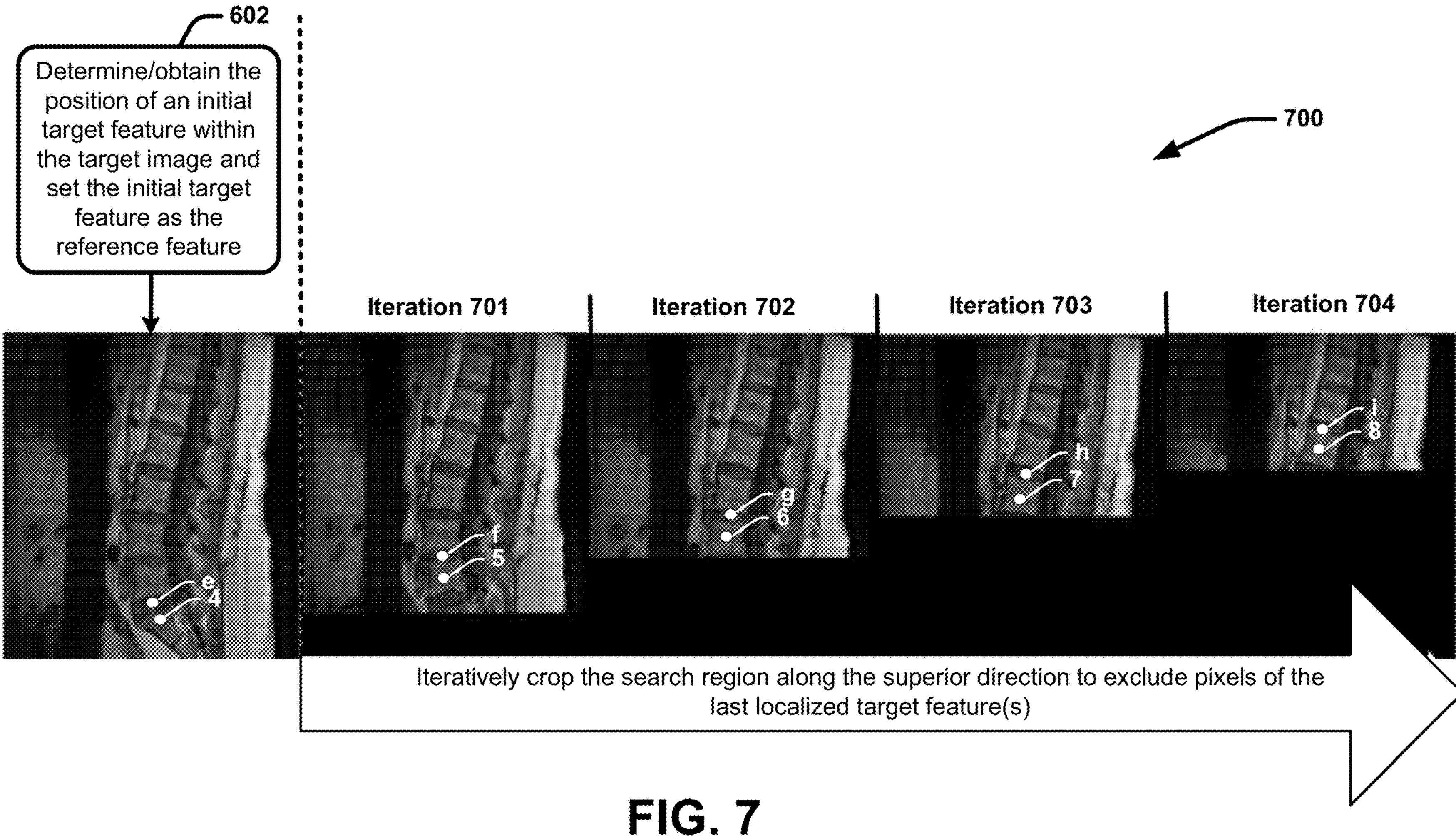
FIG. 7 demonstrates an example method for restricting the search space in accordance with an iterative feature localization process, in accordance with one or more embodiments of the disclosed subject matter.

At 608, the similarity search component 120 can define a search region within the target image based on the position of the reference feature and/or reference spatial information (e.g., included in reference spatial information 108) indicating a spatial relationship between the reference feature and the new target feature, the search region comprising a portion of the target image 104. In some embodiments, this can involve cropping the target image 104 to exclude pixels corresponding to the previously located target feature, thus progressively cropping the search region to exclude pixels of previously located target features until the last target feature is localized, as illustrated in FIG. 7 described in greater detail below. In this regard, as applied to the current iteration of process 604 wherein the reference feature (i.e., the last localized feature) corresponds to TF1, at 608, the similarity search component 120 can exude pixels corresponding to TF1 from the search region. With these embodiments, reference spatial information indicating a spatial relationship between the reference feature and target feature is not needed in association with defining the search region at 606.

In other embodiments, for each new target feature to be localized, at 608, the similarity search component 120 can define a restricted search region within the target image 104 based on the position of the last localized target feature and a reference spatial relationship (e.g., relative distance, angle and orientation as provided in the reference spatial information 108) between the last localized target feature and the new target feature. For example, the restricted search region may be controlled as a function of the known orientation between the respective features as depicted in the imaged anatomy/thing and one or more defined reference distances and/or reference angles (e.g., as defined in the reference spatial information 108) between the reference feature (i.e., the last localized target feature) and the new target feature to be localized, wherein the reference distances/angles are defined/determined based on domain knowledge for the imaged anatomy/thing. For instance, as applied to anatomical features of the human body (or another living being) the one or more defined distances may correspond to a maximum observed distance, a minimum, observed distance, an average observed distance, or another distance, as historically observed across a large distribution of subjects (e.g., hundreds, thousands, millions, etc.). With these embodiments, the reference spatial information 108 can define reference spatial relationships between the respective target features to be labeled in the target image 102. For example, reference spatial relationships can be defined for different pairs of target features, including pairs of adjacent features and non-adjacent features.

In an example implementation of these embodiments as applied to the current iteration of process 604, wherein the reference feature (i.e., the last localized feature) corresponds to TF1 and the new target feature corresponds to TF2, at 608, the similarity search component 120 can define a restricted search region (e.g., as determined based on the reference relative spatial between TF1 and TF2) within the target image 104 that extends from the position of TF1 in a direction towards TF2 such that the restricted search region most likely encompasses TF2 while excluding all or a majority of the other target features). This process is further demonstrated and described in greater detail below with reference to FIGS. 8 and 9.

Continuing with process 600, at 610, the feature localization component 116 determines the position of the new target feature (e.g., TF2 position label in accordance with the current iteration of process 604) based on pixel features included within the search region (defined at 608) as extracted from the target image 104 (e.g., or more particularly, the pixel feature data 601B for the target image 102) and reference pixel features for the new target feature as extracted from the template image 102 (e.g., or more particularly the pixel feature data 601A for the template image 102). In other words, at 610 the similarity search component 120 searches only the target image pixels feature included within the search region defined at 608 in association with finding the most similar matching pixel region of the target image 104 to the reference pixel features for the new target feature. In this regard, in some embodiments, at 610, the feature localization component 116 can set the position of the new target feature (e.g., TF2 position label) to correspond to the position of the most similar matching pixel region. In other embodiments, the feature localization component 116 may adjust the position based on an accuracy assessment of the position (e.g., via accuracy assessment component 122) using an iterative sub-process, as described with reference to FIG. 9.

Continuing with process 600, at 612, the feature localization component determines whether any additional target features are remaining for labeling. In this regard, the target features to be labeled in the target image 104 correspond to those labeled in the template image 102. If at 612, no additional target features remain, then process 600 continues to 616, wherein the feature localization component ends the process and saves all target feature position labels for the target image (e.g., corresponding to target image labels 138). If at 612, one or more additional target features remain, then process 600 proceeds back to process 604. More particularly, as indicated at 614, in association with proceeding back to process 604, at 614, the feature localization component 116 sets the last target feature as the (new) reference feature and repeats 604 for another new target feature. For example, assuming the last target feature is TF2, at 614, TF2 and its position as determined at 610 becomes the new reference feature (and reference position) for the next iteration of 604, and the new target feature becomes TF3 (wherein TF3 corresponds to the selected feature at 606 in accordance with the particular features selection protocol applied by the feature selection component 118, as described above) To this end, process 604 can be repeated until the last target feature TFn has been localized.

With reference now to FIGS. 6 and 7 in view of FIGS. 1-5, FIG. 7 demonstrates an example method for restricting the search space in accordance with iterative feature localization process 600, in accordance with one or more embodiments of the disclosed subject matter. Process 700 corresponds to an example embodiment of process 600 as applied to spine labeling of respective vertebra and discs in a target image of a region of the spine. To this end, each image shown in FIG. 7 corresponds to the target image 104 of process 600, and the respective iterations 701-704 corresponds to sequential iterations of process 604. It should be appreciated that the techniques described with respect to process 700 can be applied for localizing features in other types of images (e.g., medical depicting other spine regions, medical images depicting other anatomical regions, and non-medical images). Repetitive description of like elements employed in respective embodiments are omitted for sake of brevity.

Process 700 is demonstrated with respect to the target features respectively comprising vertebra and adjacent disc pairs (e.g., wherein the adjacent discs comprise the discs adjacent to each vertebra along the superior direction of the spine). For example, the template image 104 used in process 700 can correspond to a cropped version (e.g., cropped to exclude a region of the spine below S1, which corresponds vertebrae 4) of the template image 402 shown in FIG. 4, with the labels applied in FIG. 7 corresponding to the example identifiers for the respective vertebrae in FIG. 4 (e.g., vertebrae 4-8) and discs (e.g., e-i).

Process 700 involves iteratively cropping the search region along the superior direction to exclude pixels of the last localized target feature(s). In this regard, process 700 begins with 602 (as described with reference to FIG. 6 and process 600), wherein the feature localization component 116 determines/obtains the position of an initial target feature within the target image and sets the initial target feature as the reference feature. In this example, the initial target feature comprises the combination of vertebra 4 and disc e. Iteration 701 corresponds to the first iteration of process 604 in accordance with the subject embodiment. In accordance with the first iteration 701, at 606 the new target feature selected comprises the next adjacent vertebra/disc combination (e.g., vertebra 5/disc f) in the superior direction relative to the initial target feature (e.g., vertebra 4/disc e). At 608, the similarity search component 120 defines the search region by cropping the target image to exclude pixels corresponding to the initial target feature (e.g., vertebra 4/disc e). At 610, the feature localization component 116 determines the position of the new target feature (e.g., as labeled in FIG. 7) based on matching the reference pixel features for the target feature (as extracted from the template image 102) to the most similar pixel region included in the search region.

Iteration 702 corresponds to the next iteration of process 604, followed by iteration 703, and iteration 704. Each iteration 702, 703 and 704 follows the same process described for iteration 701. In this regard, as shown in FIG. 7, at each iteration, the new selected target feature (e.g., selected at 606) comprises the next adjacent vertebra/disc combination adjacent to the last localized vertebra/disc combination in the superior direction. In addition, at each iteration 702, 703 and 704, the similarity search component 120 incrementally crops the target image in the superior direction to exclude pixels corresponding to the previously localized target features. In this manner, at each iteration, the search space is reduced, thus increasing the accuracy of the similarity search assessment performed at each iteration.

Figure 8:
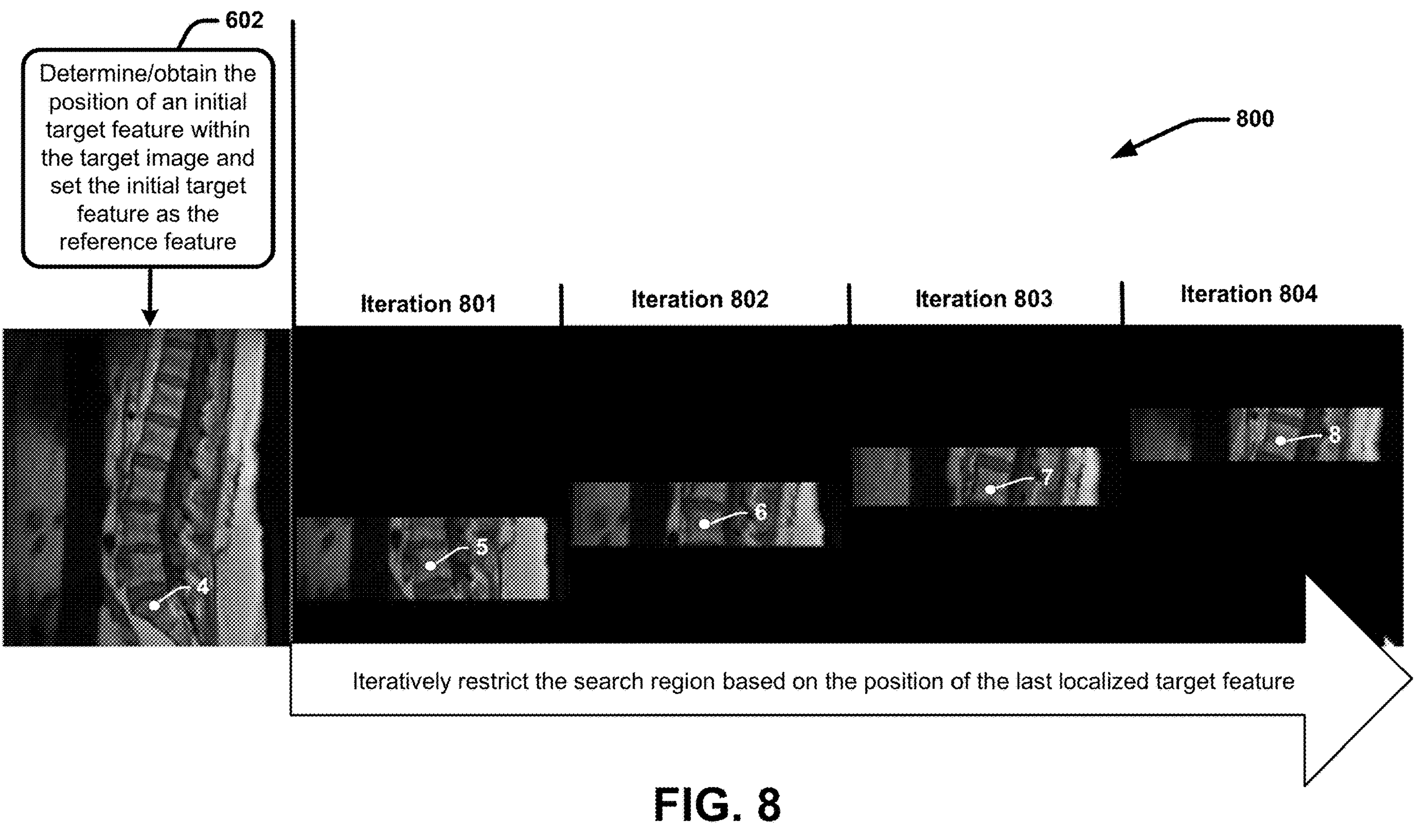
FIG. 8 demonstrates another example method for restricting the search space in accordance with an iterative feature localization process, in accordance with one or more embodiments of the disclosed subject matter.

FIG. 8 demonstrates another example method 800 for restricting the search space in accordance with iterative feature localization process 600, in accordance with one or more embodiments of the disclosed subject matter. With reference to FIGS. 6 and 8 in view of FIGS. 1-5, process 800 corresponds to another example embodiment of process 600 as applied to spine labeling of respective vertebra and discs in a target image of a region of the spine. To this end, each image shown in FIG. 8 corresponds to the target image 104 of process 600, and the respective iterations 801-804 corresponds to sequential iterations of process 604 in accordance with the subject embodiment. It should be appreciated that the techniques described with respect to process 800 can be applied for localizing features in other types of images (e.g., medical depicting other spine regions, medical images depicting other anatomical regions, and non-medical images). Repetitive description of like elements employed in respective embodiments are omitted for sake of brevity.

Process 800 is demonstrated with respect to the target features respectively comprising vertebra only. However, it should be appreciated that in other implementations the target features can comprise vertebra and adjacent disc pairs (as shown in FIG. 7). The template image 104 used in process 800 can still correspond to the template image used in process 700 (e.g., a cropped version of template image 402 shown in FIG. 4, with the labels applied in FIG. 8 corresponding to the example identifiers for the respective vertebrae in FIG. 4 (e.g., vertebrae 4-8)).

Process 800 involves restricting the search region used for each new target feature based on the position of the last localized target feature (i.e., the reference feature) and reference spatial information defining or indicating a relative spatial relationship between the new target feature and the reference feature. In this regard, process 800 begins with 602 (as described with reference to FIG. 6 and process 600), wherein the feature localization component 116 determines/obtains the position of an initial target feature within the target image and sets the initial target feature as the reference feature. In this example, the initial target feature comprises vertebra 4. Iteration 801 corresponds to the first iteration of process 604 in accordance with the subject embodiment. In accordance with the first iteration 801, at 606 the new target feature selected comprises the next adjacent vertebra (e.g., vertebra 5) to the reference feature (i.e., vertebra 4) in the superior direction relative to the reference feature. At 608, the similarity search component 120 defines the search region based on a defined (e.g., in the reference spatial information 108) spatial relationship between the reference feature (e.g., vertebra 4) and the new target feature (vertebra 5). For example, the reference spatial relationship can define one or more references distances between the reference feature and the new target feature and one or more reference angles between the respective features with respect to their imaged orientation relative to one another. For instance, in some implementations, the one or more reference distances can include a maximum observed (e.g., as determined based on domain knowledge for the imaged anatomy), an average observed distance between the respective features, and minimum observed distance between the respective features. The reference spatial information can also define a default distance to be applied in association with defining the search region. For example, in some implementations, the default distance can correspond to the maximum observed distance or another defined distance. Based on this spatial information, the similarity search component 120 can define the search region to include the region of the target image extending the default distance from the edge of (and excluding) the position of the reference feature in the direction toward the target feature. At 610, the feature localization component 116 determines the position of the new target feature (e.g., as labeled in FIG. 7) based on matching the reference pixel features for the target feature (as extracted from the template image 102) to the most similar pixel region included in the search region.

Iteration 802 corresponds to the next iteration of process 604, followed by iteration 803, and iteration 804. Each iteration 802, 803 and 704 follows the same process described for iteration 801. In this regard, as shown in FIG. 8, at each iteration, the new selected target feature (e.g., selected at 606) comprises the next adjacent to the last localized vertebra (i.e., the reference feature) in the superior direction. In addition, at each iteration 802, 803 and 804, the similarity search component 120 defines a new search region tailored to the new target feature and the particular spatial relationship defined between the new target feature and the reference feature. Thus, in accordance with this example, the reference spatial information 108 can define spatial relationships between respective pairs of adjacent target features. In this manner, at each iteration, the search space is substantially restricted to include a small region of the target image within which the target feature is assumed to be located, thus increasing the accuracy of the similarity search assessment performed at each iteration and minimizing mislabeling errors.

FIG. 9 demonstrates an example iterative sub-process 900 for optimizing feature localization in accordance with process 800, in accordance with one or more embodiments of the disclosed subject matter. Sub-process 900 corresponds to an example sub-process that can be performed at each iteration of process 800, in accordance with one or more embodiments. Repetitive description of like elements employed in respective embodiments is omitted for sake of brevity. Thus, although sub-process 900 is exemplified as applied to one iteration of process 800, that is iteration 801, it should be appreciated that sub-process 900 can be applied at each iteration of process 800. To this end, as shown with respect to iteration 801, sub-process 900 can include multiple iterations, which in this example includes four (e.g., iteration 901, iteration 902, iteration 903, and iteration 903). The number of iterations of sub-process 900 can vary within each iteration of process 800 (corresponding to each iteration of process 604).

With reference to FIG. 9 in view of FIGS. 1-8, as described with reference to process 800, at each iteration of process 800, the similarity search component 120 can define a tailored search region for the new target feature based on the position of the reference feature, that is the last previously localized target feature. In method 800, the search region was defined based on a defined distance (e.g., the maximum observed distance) for the respective features in the reference spatial information. In accordance with sub-process 900, different from process 800, the similarity search component 120 can start with a default search region (that can be defined as a function of a different distance relative to that applied at each iteration of process 800) and iteratively adjust the size and/or position of the search region over one or more iterations (e.g., iterations 901-904 respectively as exemplified in FIG. 9) until the target feature can be accurately localized (or not, in which case the feature localization component 116 can generate notification information for the target feature as opposed to a position label for the target feature indicating that the target feature cannot be accurately located and should be manually annotated).

With these embodiments, the reference spatial information 108 for each pair of features, that is each pair of reference/target features, can define the default search region (e.g., based on a default distance and/or angle between the respective features) and one or more spatial accuracy criteria that can be used by the accuracy assessment component 122 to assess whether the position of the target feature has been accurately localized at each iteration of sub-process 900. For example, in some implementations, the default search region applied in accordance with process sub-process 900 can correspond very small search region defined as a function of a very small distance (e.g., a predefined distance) extending away from the edge of the reference feature position toward the anatomical position of the target feature as oriented relative to the reference feature (e.g., which in this case is the superior direction of the spine). For instance, in some implementations, the default distance can correspond to the minimum observed distance between the respective features or be less than the minimum observed distance. With these embodiments, at each iteration of sub-process 900, the similarity search component 120 can incrementally increase the size of the search region by extending the distal end of the search region in the direction toward (and past) the target feature, which in this example is the superior direction of the spine, as shown in FIG. 9.

In this regard, at iteration 901 (e.g., the first iteration of sub-process 900), the similarity search component 120 can apply the default search region (e.g., a default search region) and attempt to localize the target feature based on pixel feature matching between the reference pixel features for the target feature and the pixel features of the target image included in the search region. This can result in either determining a potential position for the target feature or an inability to match the reference feature pixels to pixels within the default search region and determine a potential position of the target feature. In this example, the default search region corresponds to the minimum observed distance between the respective features (e.g., vertebrae 4, the reference feature, and vertebra 5, the current target feature).

In accordance with this example, at iteration 901 a potential position of the target feature, that is vertebra 5 has been determined, as illustrated with the position of the grey circle and the reference number 5 associated with the question mark symbol. If a potential position is not determined, then process sub-process 900 proceeds to another (e.g., iteration 902). If a potential position is determined, the accuracy assessment component 122 can determine a measure of accuracy of the potential position of the target feature based on defined spatial accuracy criteria for the spatial relationship between the position of the target feature and the reference feature (e.g., which in this example respectively include vertebra 5 and 4). In particular, the spatial accuracy criteria can be based on one or more defined acceptable spatial measures between the respective features, such as an acceptable distance (or distance range) and/or an acceptable angle (or angle range). With these embodiments, the accuracy assessment component 122 can determine/measure the distance and/or angle between the position of the reference feature and the potential position of target feature and determine whether the potential position is sufficiently accurate based on whether the measured value or values satisfy the spatial accuracy criteria (e.g., the defined acceptable measures). If the potential position satisfies the special accuracy criteria, then the feature localization component 116 can accept the potential position as the correct position, set this as the position of the target feature, and proceed to the next target feature (e.g., corresponding to the next iteration of process 800, that is iteration 802 yet proceeding in accordance with sub-process 900).

However, if the potential position fails to satisfy the special accuracy criteria (or cannot be localized via the pixel matching process), then the feature localization component 116 can perform another iteration of sub-process 900, which involves adjusting the search space and proceeding as described with iteration 901. For example, continuing with sub-process 900 as illustrated in FIG. 9, at iteration 902, the similarity search component 120 can define an updated search region by slightly increasing the size of the search region. To this end, the amount of adjustment of the search region at each iteration of sub-process 900 can be predefined in the reference spatial information 108. The similarity assessment component 120 can then again attempt to localize the target feature within the updated search region based on matching the reference pixel features for the target feature to the pixel features included in the updated search region. If a match cannot be identified, then sub-process 900 continues to another iteration. If a potential position is identified, the accuracy assessment component 122 again evaluates the accuracy of the potential position and accepts the potential position if it satisfies the accuracy criteria, otherwise sub-process 900 continues to another iteration.

In this regard, iterations 902-904 correspond to iteration 901, yet with the difference being at each iteration, the search region is adjusted, which in this example involves extending the distal edge of the search region away from the reference feature. In accordance with sub-process 900 as illustrated in FIG. 9, after the fourth iteration, the correct position (e.g., the position satisfying the spatial accuracy criteria) was determined. In some implementations, the feature localization component 116 can restrict the number of iterations of sub-process 900 allowed. For example, the feature localization component 116 can control sub-process 900 based on a maximum number of iterations. With these embodiments, based on an inability to accurately locate the position of the target feature once the maximum number of iterations has been reached (e.g., based on the final potential position still failing to meet the accuracy criteria and/or an inability to find a match between the reference pixel features for the target feature within the search region defined at the maximum iteration round), the feature localization component 116 can generate notification information for the target feature as opposed to a position label for the target feature indicating that the target feature cannot be accurately located and should be manually annotated. The labeling component 124 can further associated the notification information with the target image along with the target image labels 138 for the target features that were accurately localized.

Figure 10:
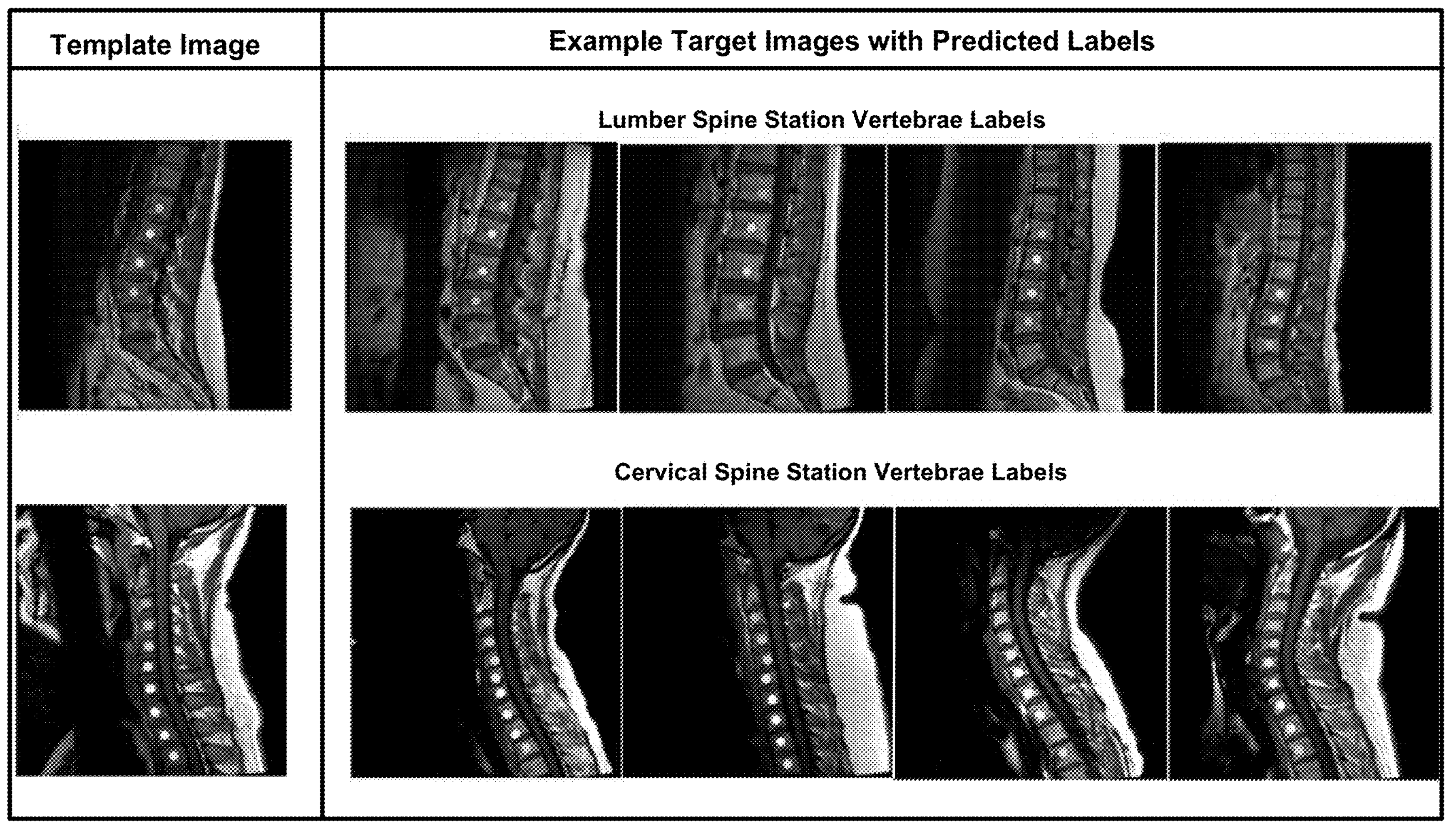
FIG. 10 presents a table illustrating different example spine images labeled in accordance with the disclosed one-shot feature localization techniques.

FIG. 10 presents a table 100 illustrating different example spine images labeled in accordance with the disclosed one-shot feature localization techniques. Table 100 presents example target lumber spine images with vertebrae labels (indicated via the dots) applied using the same template lumber spine image in accordance with one or more embodiments of process 600. Table 100 presents example target cervical spine images with vertebrae labels (indicated via the dots) applied using the same reference cervical spine image in accordance with one or more embodiments of process 600. As illustrated in table 100, process 600 results in accurately labeling respective vertebrae in both lumber and cervical spine images using only one labeled template image for the respective anatomical regions (i.e., thus a one-shot localization process) despite the different target images reflecting different anatomical variants of the reference image.

Figure 11:
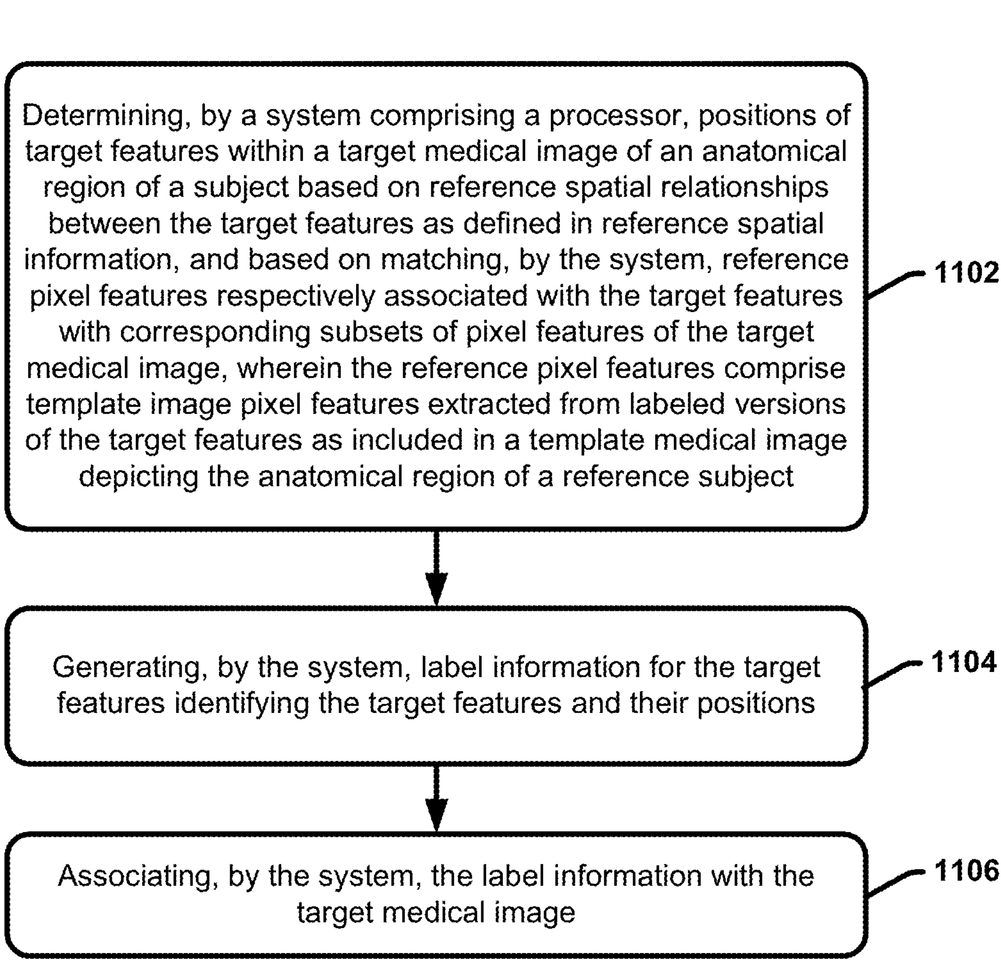
FIG. 11 illustrates an example computer-implemented process that facilitates labeling medical images using one-shot localization, in accordance with one or more embodiments of the disclosed subject matter.

FIG. 11 illustrates an example computer-implemented method 1100 that facilitates labeling medical images using one-shot localization in accordance with one or more embodiments of the disclosed subject matter. Process 1100 comprises, at 1102, determining (e.g., via feature localization component 116), by a system comprising a processor (e.g., computing system 100), positions of target features within a target medical image of an anatomical region of a subject based on reference spatial relationships between the target features as defined in reference spatial information, and based on matching, by the system (e.g., via similarity search component 120), reference pixel features respectively associated with the target features with corresponding subsets of pixel features of the target image, wherein the reference pixel features comprise template medical image pixel features extracted from labeled versions of the target features as included in a template medical image depicting the anatomical region of a reference subject. At 1104, method 1100 comprises generating, by the system (e.g., via labeling component 124), label information for the target features identifying the target features and their positions (e.g., target image labels 138). At 1106, method 1100 comprises associating, by the system, the label information with the target medical image (e.g., via labeling component 124).

In accordance with method 1100, the pixel features of the target image and the reference pixel features respectively comprise extracted pixel features respectively extracted from the target medical image and the template medical image using one or more (pretrained) feature extraction models (as described with reference to FIG. 2). In some embodiments, the one or more feature extraction models were trained on natural images. In other embodiments, the one or more feature extraction models can be trained on medical images. In some embodiments, the feature extraction component 114 can generate the extracted pixel features. In other embodiments, the extracted pixel features can be received by the annotation component 110 along with the template image and the target image.

In various embodiments, process 1100 can be repeated by the feature localization component for a plurality of target images included in the target image dataset 106, wherein at each iteration of process 1100, the feature localization component uses the same reference image, that is the same reference features, making process 1100 a one-shot medical image feature localization process.

In some implementations of process 1100, the reference pixel features respectively represent the target features and one or more adjacent features to the target features (e.g., vertebra and adjacent disc combinations).

In some embodiments of process 1100, the determining at 1102 comprises determining the positions of respective ones of the target features individually and comprises determining a position of a current target feature based on a previously determined position of a previously localized target feature within the target medical image. With these embodiments, each of the target features can be sequentially localized and labeled in accordance with process 600.

In some implementations of these embodiments, the determining the positions at 1102 comprises determining the positions of the respective ones of the target features individually in accordance with an order tailored based on the anatomical region. For example, in implementations in which the anatomical region comprises a region of a spine and wherein the target features comprise vertebrae included in the region of the spine, the order can correspond to a natural sequential order of the vertebrae such that the current target feature and the previously localized target feature comprise adjacent vertebrae, and wherein reference spatial relationships comprise spatial relationships between pairs of adjacent vertebrae.

The determining of the positions of the respective ones of the target features individually can also comprise restricting respective regions of the pixel features of the target image searched in association with performing the matching (e.g., via the similarity search component 120) based on respective positions of previously localized target features within the target image. For example, this can involve excluding pixel regions of the target image corresponding to the respective positions of the previously localized target features from the respective regions, as described with reference to FIGS. 7-9.

Additionally, or alternatively, the restricting can comprise defining, by the system (e.g., via similarity search component 120), a search region for the current target feature based on a reference spatial relationship between the current target feature and the previously localized target feature, and constraining, by the system, the pixel features of the target imaged searched to a portion of the pixel features included in the search region in association with matching a subset of the reference pixel features associated with the current target feature to a corresponding subset of the pixel features of the target image, (e.g., as described with reference to FIGS. 8 and 9. For example, the search region can be defined based on a known orientation of the current target feature relative to the previously localized target feature and at least one of, a reference distance between the current target feature and the previously localized target feature, or a reference angle between the current target feature and the previously localized target feature.

In some implementations, the determining the position of the current target feature comprises iteratively adjusting a size or position of the search region and iteratively performing the matching until the position of the current target feature determined based on the matching satisfies a defined spatial accuracy criterion, as described with reference to FIG. 9. For example, the iteratively adjusting can comprise iteratively increasing the size of the search region, and wherein the defined spatial accuracy criterion comprises an acceptable distance or an acceptable angle between the position and the previously determined position of the previously localized target feature.

Example Operating Environments

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. To this end, the a computer readable storage medium, a machine-readable storage medium, or the like as used herein can include a non-transitory computer readable storage medium, a non-transitory machine-readable storage medium, and the like.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 12, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 12:
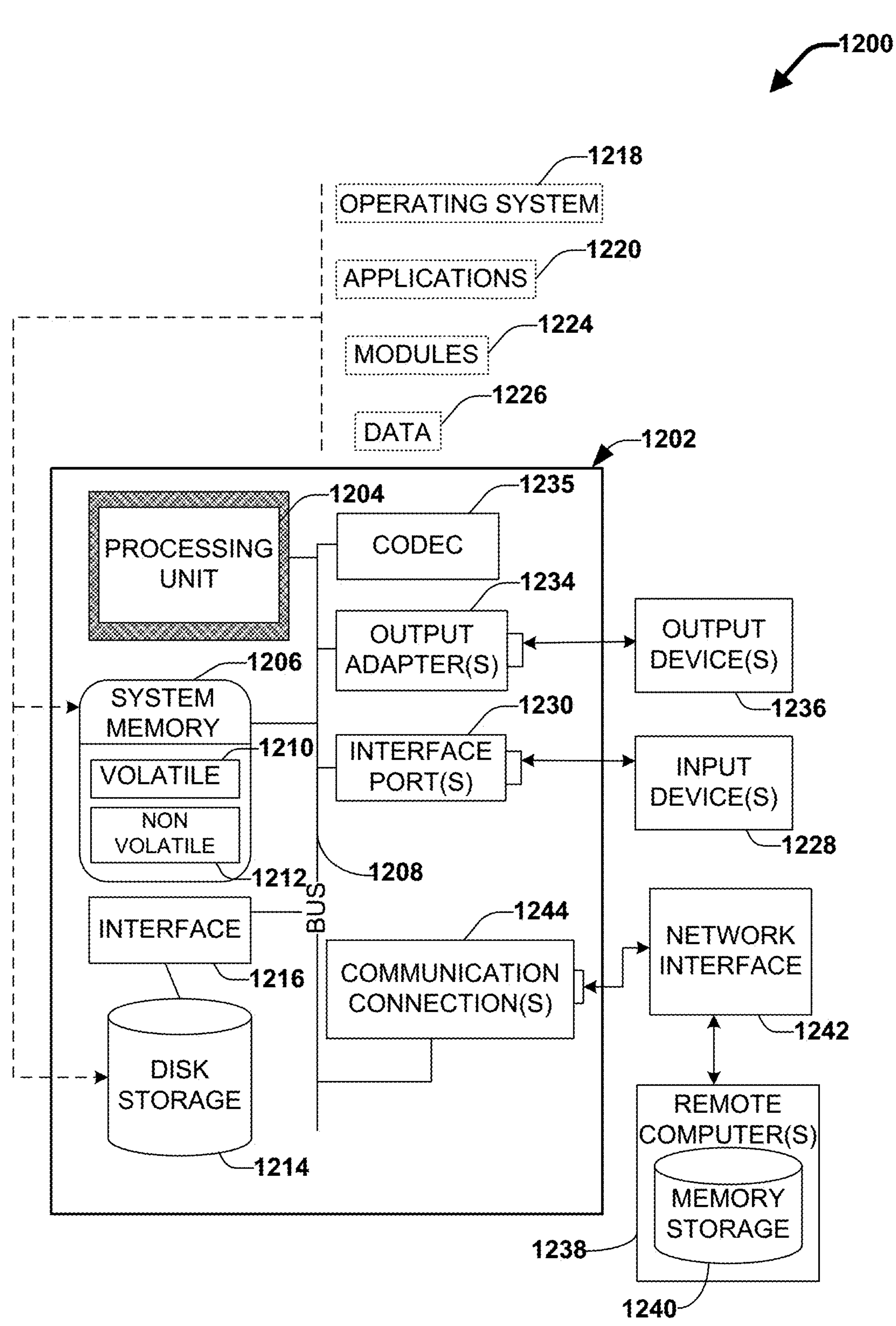
FIG. 12 illustrates a block diagram of an example, non-limiting operating environment in which one or more embodiments described herein can be facilitated.

With reference to FIG. 12, an example environment 1200 for implementing various aspects of the claimed subject matter includes a computer 1202. The computer 1202 includes a processing unit 1204, a system memory 1206, a codec 1235, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13124), and Small Computer Systems Interface (SCSI).

The system memory 1206 includes volatile memory 1210 and non-volatile memory 1212, which can employ one or more of the disclosed memory architectures, in various embodiments. The basic input/output system (BIOS), containing the basic routines to transfer information between elements within the computer 1202, such as during start-up, is stored in non-volatile memory 1212. In addition, according to present innovations, codec 1235 can include at least one of an encoder or decoder, wherein the at least one of an encoder or decoder can consist of hardware, software, or a combination of hardware and software. Although, codec 1235 is depicted as a separate component, codec 1235 can be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1212 can employ one or more of the disclosed memory devices, in at least some embodiments. Moreover, non-volatile memory 1212 can be computer memory (e.g., physically integrated with computer 1202 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1210 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1202 can also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD), flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1214 to the system bus 1208, a removable or non-removable interface is typically used, such as interface 1216. It is appreciated that disk storage 1214 can store information related to a user. Such information might be stored at or provided to a server or to an application running on a user device. In one embodiment, the user can be notified (e.g., by way of output device(s) 1236) of the types of information that are stored to disk storage 1214 or transmitted to the server or application. The user can be provided the opportunity to opt-in or opt-out of having such information collected or shared with the server or application (e.g., by way of input from input device(s) 1228).

It is to be appreciated that FIG. 12 describes software that acts as an intermediary between users and the basic computer resources described in the suitable operating environment 1200. Such software includes an operating system 1210. Operating system 1210, which can be stored on disk storage 1214, acts to control and allocate resources of the computer 1202. Applications 1220 take advantage of the management of resources by operating system 1210 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port can be used to provide input to computer 1202 and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

determining, by a system comprising a processor, positions of target features within a target medical image of an anatomical region of a subject, on wherein the determining comprises:

determining, by the system, a first position of a first target feature within the target medical image;

defining, by the system, a search region within the target medical image corresponding to a portion of the target medical image associated with a second target feature based on a reference spatial relationship between the first target feature and the second target feature; and determining, by the system, a second position of the second target feature based on a measure of similarity between a pixel feature subset included in the search region and a reference pixel feature subset associated with the second target feature;

generating, by the system, label information for the target features identifying the target features and their positions; and associating, by the system, the label information with the target medical image.

2. The method of claim 1, further comprising:

extracting, by the system, target image pixel features for respective pixels of the target medical image using a feature extraction model trained on natural images, wherein the pixel feature subset comprises one or more of the target image pixel features;

extracting, by the system, reference pixel features for respective pixels of a reference medical image using the feature extraction model, and wherein the reference medical image depicts versions of the target features and comprises labels identifying the versions; and determining, by the system, respective reference subsets of the reference pixel features associated with the target features based on labels, wherein the reference pixel feature subset is included in the respective reference subsets.

3. The method of claim 2, further comprising:

reusing, by the system, the respective reference subsets in association with determining additional positions of the target features as included in additional target medical images of the anatomical region for different subjects.

4. The method of claim 2, wherein at least some of the respective reference subsets represent a combination of a target feature and one or more adjacent features to the target feature.

5. The method of claim 1, wherein determining the positions of the target features comprises determining the positions of the target features one at a time and in accordance with an order tailored based on the anatomical region.

6. The method of claim 5, wherein the anatomical region comprises a region of a spine, wherein the target features comprise vertebrae included in the region of the spine, wherein the order corresponds to a natural sequential order of the vertebrae such that the first target feature and the second target feature comprise adjacent vertebrae.

7. The method of claim 1, wherein defining the search region comprises excluding, from the search region, another portion of the target medical image corresponding to the first position of the first target feature.

8. The method of claim 1, wherein the reference spatial relationship is selected from the group consisting of: a reference orientation of the first target feature relative to the second target feature, a reference distance between the first target feature and the second target feature, and a reference angle between the first target feature and the second target feature.

9. The method of claim 1, wherein determining the position of the second target feature comprises:

iteratively adjusting, by the system, a size or position of the search region, resulting in updated search regions;

iteratively determining, by the system, potential positions of the second target feature based on respective measures of similarity between the reference pixel feature subset and respective pixel feature subsets included in the updated search regions; and setting, by the system, a potential position as the second position based on the potential position satisfying a defined spatial accuracy criterion.

10. The method of claim 9, wherein the iteratively adjusting comprises iteratively increasing the size of the search region, and wherein the defined spatial accuracy criterion comprises an acceptable distance or an acceptable angle between the potential position and the first position of the first target feature.

11. A system, comprising:

at least one memory that stores computer-executable components; and at least one processor that executes the computer-executable components stored in the at least one memory, wherein the computer-executable components comprise:

a feature localization component that sequentially determines positions of target features within a target medical image of an anatomical region of a subject, wherein for each current target feature, the feature localization component:

defines a search region within the target medical image corresponding to a portion of the target medical image associated with the current target feature based on one or more previously determined positions, within the target medical image, of one or more preceding target features; and determines a position of the target feature based on a measure of similarity between a subset of pixel features of the target image included in the search region and a reference subset of reference pixel features associated with the current target feature; and a labeling component that generates label information for the target features identifying the target features and their positions and associates the label information with the target medical image.

12. The system of claim 11, wherein the pixel features of the target image and the reference pixel features respectively comprise extracted pixel features respectively extracted from the target medical image and a reference medical image using one or more feature extraction models trained on natural images.

13. The system of claim 11, wherein the feature localization component sequentially determines the positions of the target features in accordance with an order tailored based on the anatomical region, wherein the anatomical region comprises a region of a spine, wherein the target features comprise vertebrae included in the region of the spine, and wherein the order corresponds to a natural sequential order of the vertebrae such that the current target feature and an immediately preceding target feature to the current target feature comprise adjacent vertebrae.

14. The system of claim 11, wherein for each current target feature, the feature localization component defines the search region based on a reference spatial relationship between the current target feature and at least one preceding target feature of the one or more preceding target features.

15. The system of claim 14, wherein the at least one preceding target feature comprises an adjacent feature to the current target feature and wherein the reference spatial relationship comprises a reference distance, a reference orientation, and a reference angle.

16. The system of claim 11, wherein the feature localization component restricts the search region to exclude one or more portions of the target image corresponding to the one or more preceding target features.

17. A non-transitory machine-readable storage medium, comprising executable instructions that, when executed by a processor, facilitate performance of operations, comprising:

determining positions of target features within a target medical image of an anatomical region of a subject, wherein the determining comprises:

determining a first position of a first target feature within the target medical image;

defining a search region within the target medical image corresponding to a portion of the target medical image associated with a second target feature based on a reference spatial relationship between the first target feature and the second target feature; and determining a second position of the second target feature based on a measure of similarity between a pixel feature subset included in the search region and a reference pixel feature subset associated with the second target feature;

generating label information for the target features identifying the target features and their positions; and associating the label information with the target medical image.

18. The non-transitory machine-readable storage medium of claim 17, wherein defining the search region comprises excluding, from the search region, another portion of the target medical image corresponding to the first position of the first target feature.

19. The non-transitory machine-readable storage medium of claim 17, wherein determining the position of the second target feature comprises:

iteratively adjusting a size or position of the search region, resulting in updated search regions;

iteratively determining potential positions of the second target feature based on respective measures of similarity between the reference pixel feature subset and respective pixel feature subsets included in the updated search regions; and setting a potential position as the second position based on the potential position satisfying a defined spatial accuracy criterion.

20. The non-transitory machine-readable storage medium of claim 19, wherein the iteratively adjusting comprises iteratively increasing the size of the search region, and wherein the defined spatial accuracy criterion comprises an acceptable distance or an acceptable angle between the potential position and first position of the first target feature.

* * * * *